(12) United States Patent
Noda

(10) Patent No.: US 11,050,722 B2
(45) Date of Patent: Jun. 29, 2021

(54) INFORMATION PROCESSING DEVICE, PROGRAM, AND INFORMATION PROCESSING METHOD

(71) Applicant: FUJITSU LIMITED, Kawasaki (JP)

(72) Inventor: Bintatsu Noda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 317 days.

(21) Appl. No.: 16/126,276

(22) Filed: Sep. 10, 2018

(65) Prior Publication Data

US 2019/0081934 A1 Mar. 14, 2019

(30) Foreign Application Priority Data

Sep. 12, 2017 (JP) .............................. JP2017-174614

(51) Int. Cl.
*H04L 29/06* (2006.01)
*H04L 9/08* (2006.01)
*H04L 9/32* (2006.01)
*H04L 29/08* (2006.01)

(52) U.S. Cl.
CPC ........ *H04L 63/0471* (2013.01); *H04L 9/0819* (2013.01); *H04L 9/3213* (2013.01); *H04L 63/0435* (2013.01); *H04L 63/0442* (2013.01); *H04L 63/10* (2013.01); *H04L 63/12* (2013.01); *H04L 63/08* (2013.01); *H04L 67/02* (2013.01); *H04L 67/2814* (2013.01)

(58) Field of Classification Search
CPC . H04L 63/0471; H04L 9/0819; H04L 9/3213; H04L 63/0435; H04L 63/0442; H04L 63/10; H04L 63/12; H04L 63/08; H04L 67/02; H04L 67/2814

See application file for complete search history.

(56) References Cited

U.S. PATENT DOCUMENTS

| 8,825,999 | B2 * | 9/2014 | Mohamed | H04L 63/0428 713/153 |
| 8,886,822 | B2 * | 11/2014 | Pedersen | H04L 67/34 709/231 |
| 8,935,418 | B2 * | 1/2015 | Knouse | H04L 63/10 709/229 |

(Continued)

FOREIGN PATENT DOCUMENTS

| JP | 2005-86428 | 3/2005 |
| JP | 2012-151843 | 8/2012 |
| JP | 2016-531528 | 10/2016 |

*Primary Examiner* — Joseph P Hirl
*Assistant Examiner* — Stephen T Gundry
(74) *Attorney, Agent, or Firm* — Fujitsu Patent Center

(57) ABSTRACT

An information processing device using a primary function provided by a first server, includes a processor configured to receive, from the first server, access destination data effecting redirection to a second server providing a secondary function to be used by the primary function, send key data for encryption to the second server by adding the key data for encryption to the access destination data, transferring the access destination data to a browser, and redirecting the browser, and decrypt encrypted data based on at least a part of a response by the secondary function, the encrypted data being included in a response by the primary function, by using key data for decryption, the key data for decryption being adapted to the key data for encryption.

11 Claims, 33 Drawing Sheets

(56) References Cited

U.S. PATENT DOCUMENTS

| | | | | |
|---|---|---|---|---|
| 8,959,347 | B2* | 2/2015 | Gupta | H04L 67/2814 713/170 |
| 9,154,470 | B2* | 10/2015 | Lebron | H04L 63/0846 |
| 9,231,764 | B2* | 1/2016 | Gupta | H04L 63/083 |
| 9,338,185 | B2* | 5/2016 | Evenden | H04L 63/0823 |
| 9,608,809 | B1* | 3/2017 | Ghetti | H04L 9/0819 |
| 9,619,632 | B2* | 4/2017 | Savage | G06F 21/31 |
| 9,813,400 | B2* | 11/2017 | Ross | H04L 63/0815 |
| 9,832,024 | B2* | 11/2017 | Xu | H04L 9/3247 |
| 10,003,587 | B2* | 6/2018 | Kobayashi | H04L 63/06 |
| 10,110,579 | B2* | 10/2018 | Fitch | H04L 63/08 |
| 10,313,112 | B2* | 6/2019 | Fitch | H04L 9/0825 |
| 10,356,071 | B2* | 7/2019 | Whiteside | H04L 67/14 |
| 10,581,806 | B2* | 3/2020 | Yoshimuta | H04L 63/0807 |
| 2012/0183144 | A1 | 7/2012 | Lakshminarayanan | |
| 2013/0054968 | A1* | 2/2013 | Gupta | H04L 63/08 713/168 |
| 2014/0189808 | A1* | 7/2014 | Mahaffey | H04L 63/0853 726/4 |
| 2015/0143475 | A1* | 5/2015 | Song | G06F 21/40 726/4 |
| 2015/0163061 | A1* | 6/2015 | Gupta | H04L 9/0643 713/155 |
| 2015/0333917 | A1* | 11/2015 | Savage | G06F 21/6227 713/168 |
| 2015/0350179 | A1* | 12/2015 | Kobayashi | H04L 9/3273 726/4 |
| 2015/0365394 | A1* | 12/2015 | Fitch | H04L 9/32 726/7 |
| 2016/0134599 | A1* | 5/2016 | Ross | G06F 21/41 713/168 |
| 2016/0182221 | A1 | 6/2016 | Cucinotta et al. | |
| 2016/0359846 | A1* | 12/2016 | Yoshimuta | H04L 67/146 |
| 2017/0093835 | A1* | 3/2017 | Whiteside | G06F 21/335 |
| 2017/0141926 | A1* | 5/2017 | Xu | H04L 9/3263 |
| 2017/0149740 | A1* | 5/2017 | Mansour | H04L 9/0822 |
| 2018/0034796 | A1* | 2/2018 | Ross | H04L 63/0823 |
| 2018/0041336 | A1* | 2/2018 | Keshava | G06F 21/33 |
| 2018/0062858 | A1* | 3/2018 | Xu | H04L 9/3252 |
| 2018/0278584 | A1* | 9/2018 | Kuperman | H04L 63/101 |
| 2019/0068377 | A1* | 2/2019 | Matsugashita | H04L 9/3247 |
| 2019/0334884 | A1* | 10/2019 | Ross | H04L 63/0442 |

* cited by examiner

FIG.3

DO YOU AUTHORIZE OR
REJECT CALL OF "XXX" BY
"AAA"?

AUTHORIZE    REJECT

FIG.6

DO YOU AUTHORIZE OR REJECT CALL OF
"YYY" BY "XXX" CALLED BY "AAA"?

[AUTHORIZE]   [REJECT]

FIG. 8B

| PRIMARY ACCESS TOKEN | CRYPTOGRAPHIC KEY |
|---|---|
| TX_A | KA_Y |
| ⋮ | ⋮ |

FIG. 11

PRIMARY RESOURCE OWNER

BROWSER 103

PRIMARY AUTHORIZATION SERVER-CUM-PRIMARY RESOURCE SERVER

109 — Web API_X

S1101 GENERATE PRIMARY AGREEMENT SCREEN

S1103 TRANSMIT PRIMARY AGREEMENT SCREEN DATA

S1105 PRIMARY AGREEMENT SCREEN DATA

S1107 DISPLAY PRIMARY AGREEMENT SCREEN

S1109 RECEIVE PRIMARY AUTHORIZATION

S1111 TRANSMIT PRIMARY AUTHORIZATION NOTIFICATION

S1113 PRIMARY AUTHORIZATION NOTIFICATION

| PRIMARY ACCESS TOKEN | URL OF SECONDARY RESOURCE SERVER | SECONDARY LOCAL STATE | | SECONDARY AUTHORIZATION CODE | SECONDARY ACCESS TOKEN |
|---|---|---|---|---|---|
| | | SECONDARY RANDOM | PRIMARY CLIENT NAME | | |
| TX_A | URL OF Web API_Y | RX_A | AAA | CY_X1 | TY_X1 |
| TX_B | URL OF Web API_Y | RX_B | BBB | CY_X2 | TY_X2 |
| ... | ... | ... | ... | ... | ... |

| SECONDARY ACCESS TOKEN | CRYPTOGRAPHIC KEY |
|---|---|
| TY_X1 | KA_Y |
| TY_X2 | KB_Y |
| ⋮ | ⋮ |

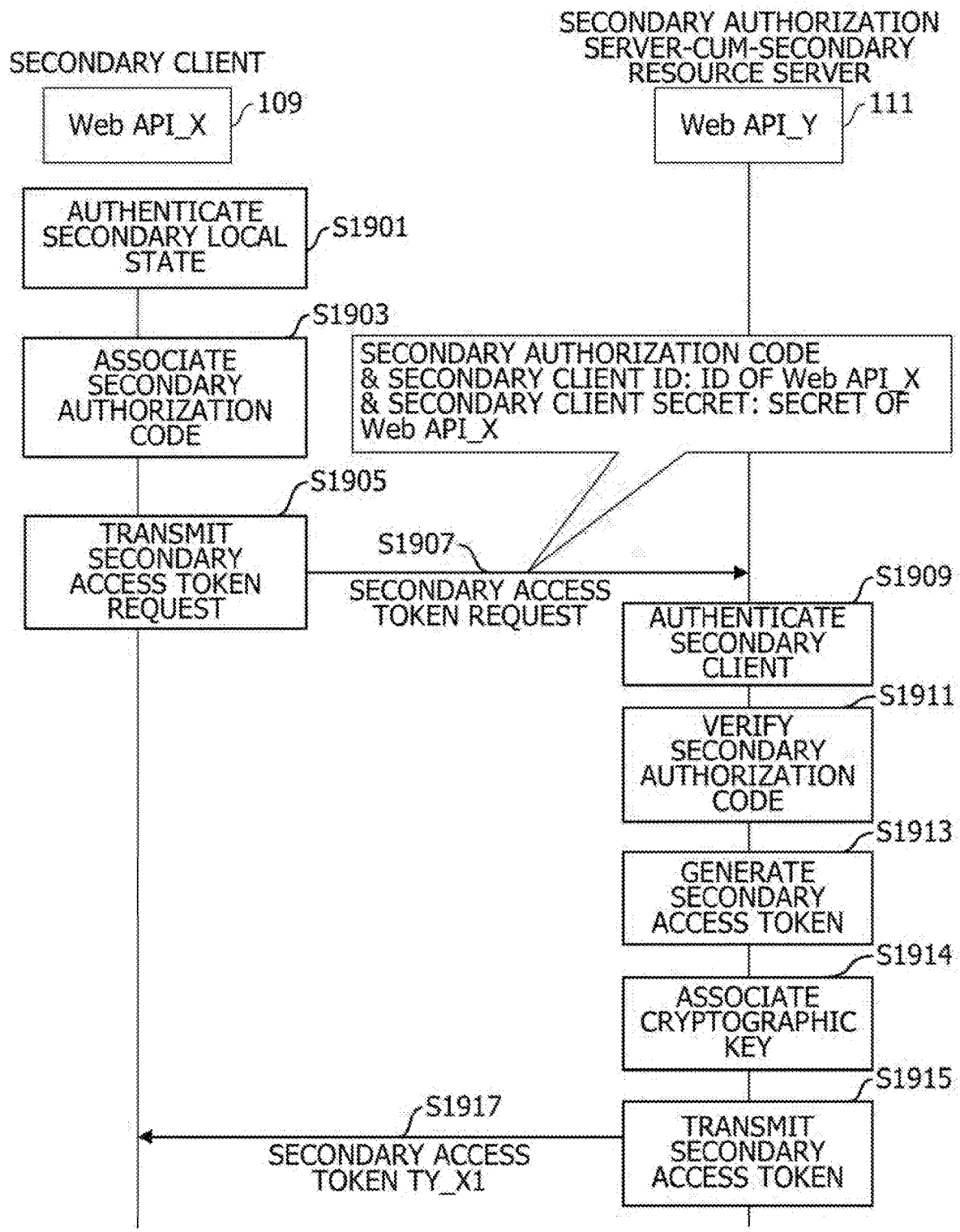

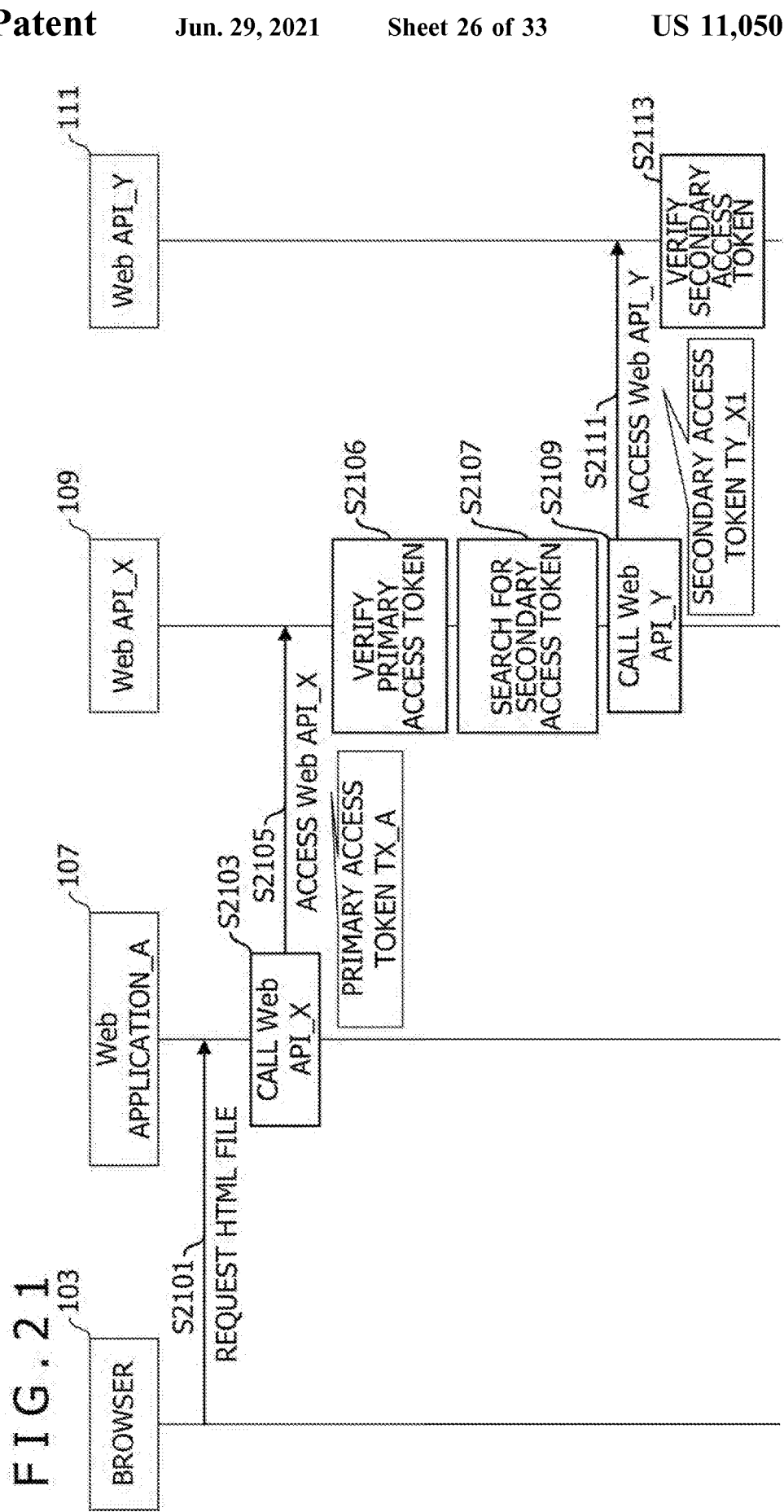

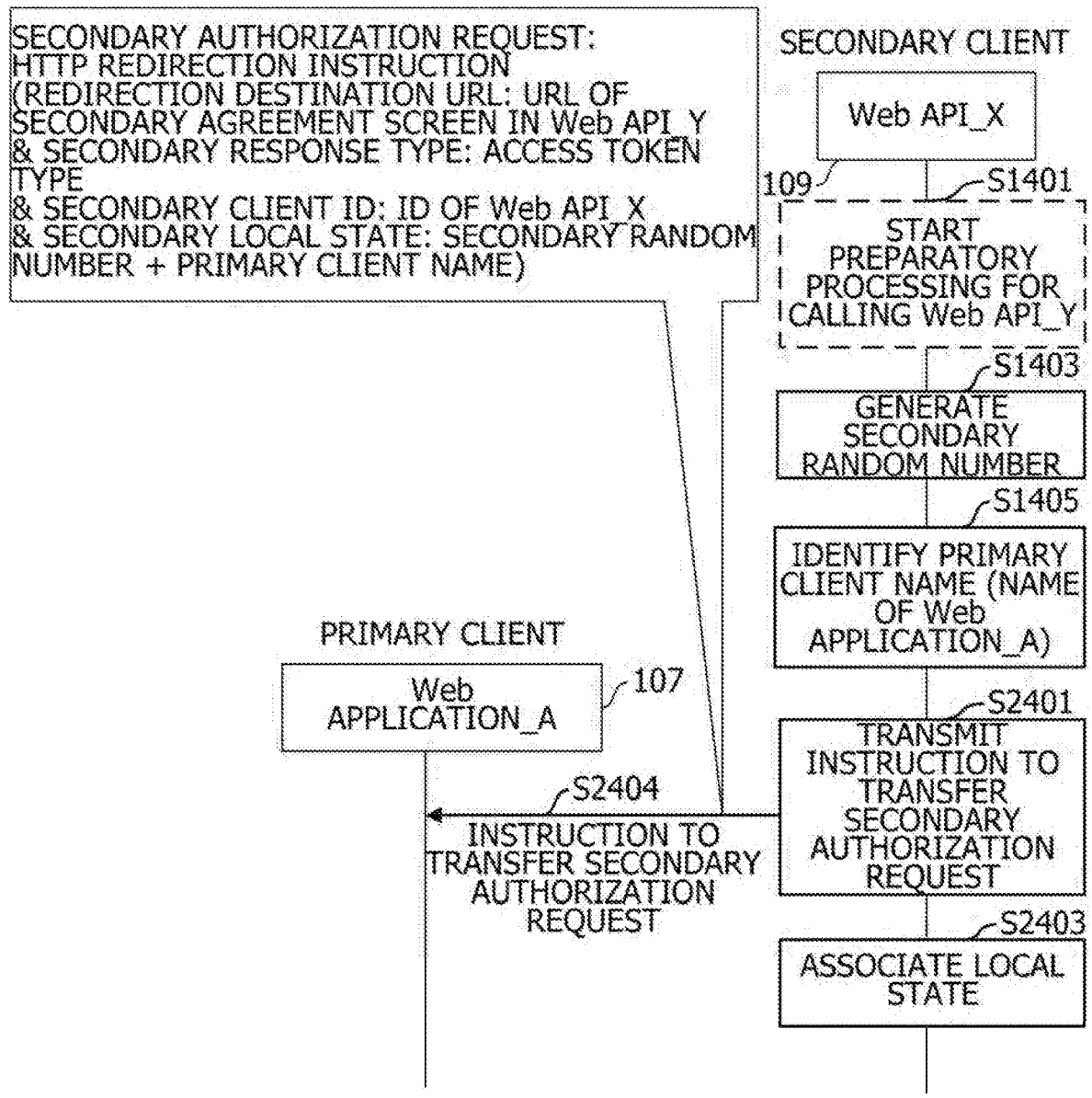

INFORMATION PROCESSING DEVICE, PROGRAM, AND INFORMATION PROCESSING METHOD

CROSS-REFERENCE TO RELATED APPLICATION

This application is based upon and claims the benefit of priority of the prior Japanese Patent Application No. 2017-174614, filed on Sep. 12, 2017, the entire contents of which are incorporated herein by reference.

FIELD

The embodiments discussed herein are related to a concealing technology in a function call via a network.

BACKGROUND

In a mode in which a Web application cooperating with a browser uses a Web application programming interface (API) function, various services are expected to be realized when the primary Web API used by the Web application further uses a secondary Web API function.

In the mode of thus calling the Web APIs in multiple stages, when the response of a secondary Web API has highly confidential contents, protection thereof from exposure in an intermediate stage is desirably provided.

In a certain multistage call mode, without the primary Web API using the response of the secondary Web API, the secondary response may be included as it is in the response of the primary Web API, and sent back to the Web application. In such a case, the secondary response received by the primary Web API does not need to be plain text.

However, the Web application does not originally assume calling the secondary Web API directly. It is therefore difficult for the Web application to cooperate with the secondary Web API spontaneously.

Examples of the related art include Japanese Laid-open Patent Publication No. 2005-86428, Japanese National Publication of International Patent Application No. 2016-531528, and Japanese Laid-open Patent Publication No. 2012-151843.

SUMMARY

According to an aspect of the embodiments, an information processing device using a primary function provided by a first server, includes a processor configured to receive, from the first server, access destination data effecting redirection to a second server providing a secondary function to be used by the primary function, send key data for encryption to the second server by adding the key data for encryption to the access destination data, transferring the access destination data to a browser, and redirecting the browser, and decrypt encrypted data based on at least a part of a response by the secondary function, the encrypted data being included in a response by the primary function, by using key data for decryption, the key data for decryption being adapted to the key data for encryption.

This object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a primary agreement screen;

FIG. 6 is a diagram illustrating an example of a secondary agreement screen;

FIG. 8B is a diagram illustrating an example of a first association table;

FIG. 11 is a diagram illustrating a sequence example of a primary authorization;

FIG. 15 is a diagram illustrating an example of a second association table;

FIG. 16B is a diagram illustrating an example of a third association table;

FIG. 19A is a diagram illustrating a sequence example of a secondary authorization and a secondary API call;

FIG. 21 is a diagram illustrating a sequence example of a primary API call and a secondary API call;

FIG. 24A is a diagram illustrating a sequence example of a secondary authorization in the second embodiment;

DESCRIPTION OF EMBODIMENTS

Figure 1:
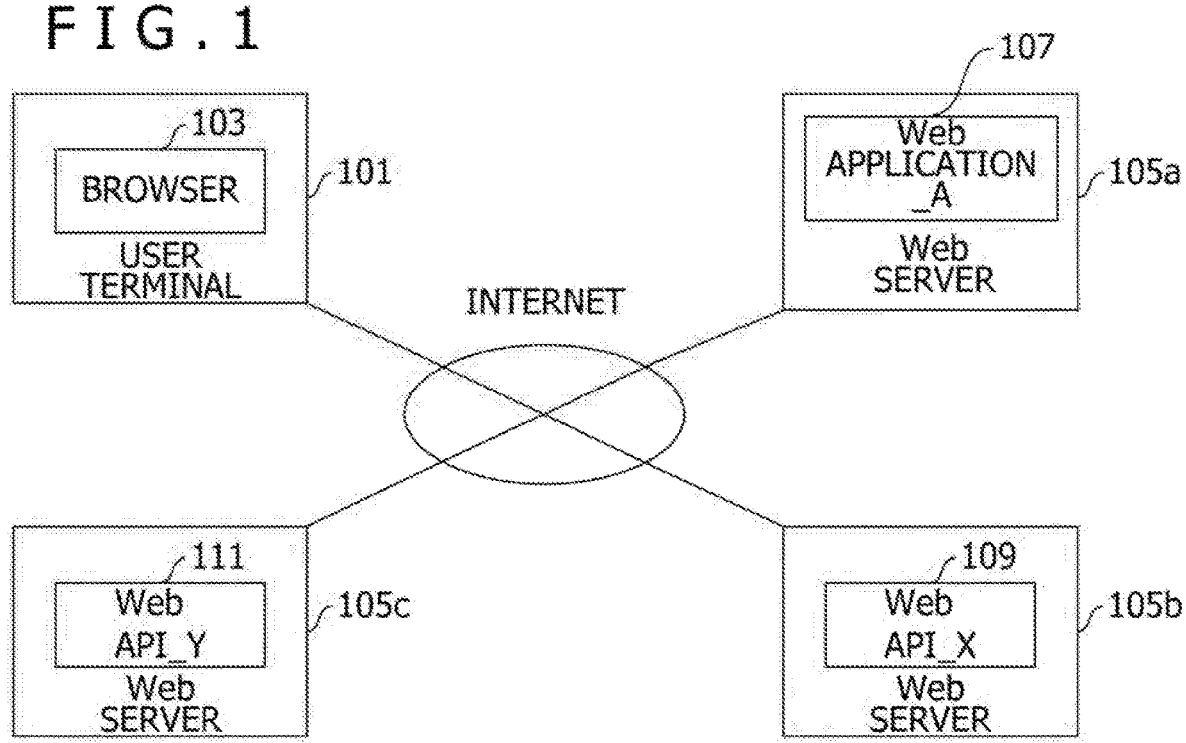
FIG. 1 is a diagram illustrating an example of a configuration of a network.

FIG. 1 illustrates an example of a configuration of a network. A user terminal 101 includes a browser 103, and has a function of connecting to the Internet. A Web server 105a is connected to the Internet. The Web server 105a includes a Web application_A 107. The Web application_A 107 in the present example provides a hypertext markup language (HTML) file in response to a request from the browser 103. Incidentally, the Web application_A 107 is an example of an application program that cooperates with the browser 103.

A Web server 105b includes a Web API_X 109. Suppose in the present example that the Web API_X 109 is called by the Web application_A 107, and provides a service related to a given function to the Web application_A 107. A Web server 105c includes a Web API_Y 111. Suppose in the present example that the Web API_Y 111 is called by the Web API_X 109, and provides a service related to a given function to the Web API_X 109.

Figure 2:
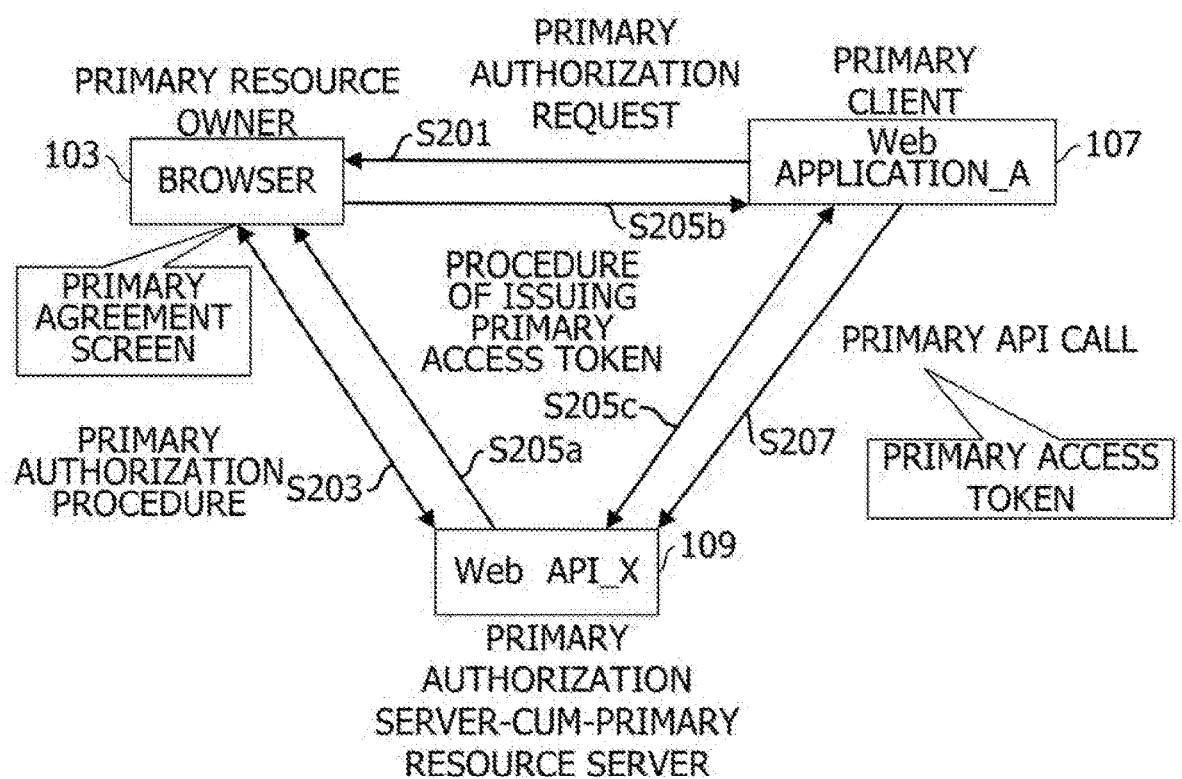
FIG. 2 is a diagram illustrating an outline of a primary authorization and a primary API call.

FIG. 2 illustrates an outline of a primary authorization and a primary API call. In the present example, an authorization received from a user with regard to a right for the Web application_A 107 to use the Web API_X 109 will be referred to as a primary authorization. In addition, a call of the Web API_X 109 based on the primary authorization will be referred to as a primary API call. Incidentally, in the following, entities, programs, processing, screens, data, parameters, and the like related to the primary authorization are provided with the word "primary" to be differentiated from entities, programs, processing, screens, data, parameters, and the like related to a secondary authorization to be described later.

A procedure of the primary authorization in the present example is compliant with OAuth. OAuth is an open standard related to a procedure of performing right authorization. A program in the present example is applied to entities in OAuth. The browser 103 is a resource owner in the primary authorization (for example, a primary resource owner). The resource owner directly receives a user agreement about an access right to a protected resource. The Web application_A 107 is a client in the primary authorization (for example, a primary client). The client uses the protected resource when given the access right. The Web API_X 109 is an authorization server in the primary authorization (for example, a primary authorization server). The authorization server obtains the user agreement, and issues a token (access token) for accessing the protected resource. The Web API_X 109 is, further, a resource server in the primary authorization (for example, a primary resource server). The resource server manages the protected resource.

First, the Web application_A 107 intending to use the Web API_X 109 sends a primary authorization request to the browser 103 (S201). Next, the Web API_X 109 receives a primary authorization after a procedure of the primary authorization is performed between the browser 103 and the Web API_X 109 (S203). Incidentally, in the procedure of the primary authorization, a primary agreement screen is displayed on the browser 103.

FIG. 3 illustrates an example of the primary agreement screen. "AAA" is the name of the Web application_A 107. "XXX" is the name of the Web API_X 109. As illustrated in FIG. 3, a comment is displayed which includes contents for confirming the agreement about the calling of the primary resource server by the primary client. When an authorization button displaying "AUTHORIZE" is selected, it means that the user authorizes the calling of the Web API_X 109 by the Web application_A 107. When a rejection button displaying "REJECT" is selected, on the other hand, it means that the user rejects the calling of the Web API_X 109 by the Web application_A 107.

The description returns to FIG. 2. When the Web API_X 109 receives the primary authorization, the Web API_X 109 issues a primary access token. The primary access token is handed over to the Web application_A 107. In the present embodiment, description will be made of an example in which the primary access token is issued by an authorization code grant method in OAuth. In the present example, an authorization code is sent from the Web API_X 109 to the Web application_A 107 via the browser 103 (S205a and S205b), and thereafter the primary access token is sent based on the authorization code (S205c).

Obtaining the primary access token, the Web application_A 107 calls the Web API_X 109 with the primary access token (S207). The Web API_X 109 confirms that the primary access token is valid, and provides a service based on a command function of the called Web API_X 109.

In the present example, it is further assumed that the Web API_X 109 uses the Web API_Y 111. An authorization received from the user with regard to a right for the Web API_X 109 to use the Web API_Y 111 will be referred to as a secondary authorization. In addition, a call of the Web API_Y 111 based on the secondary authorization will be referred to as a secondary API call.

Figure 4:
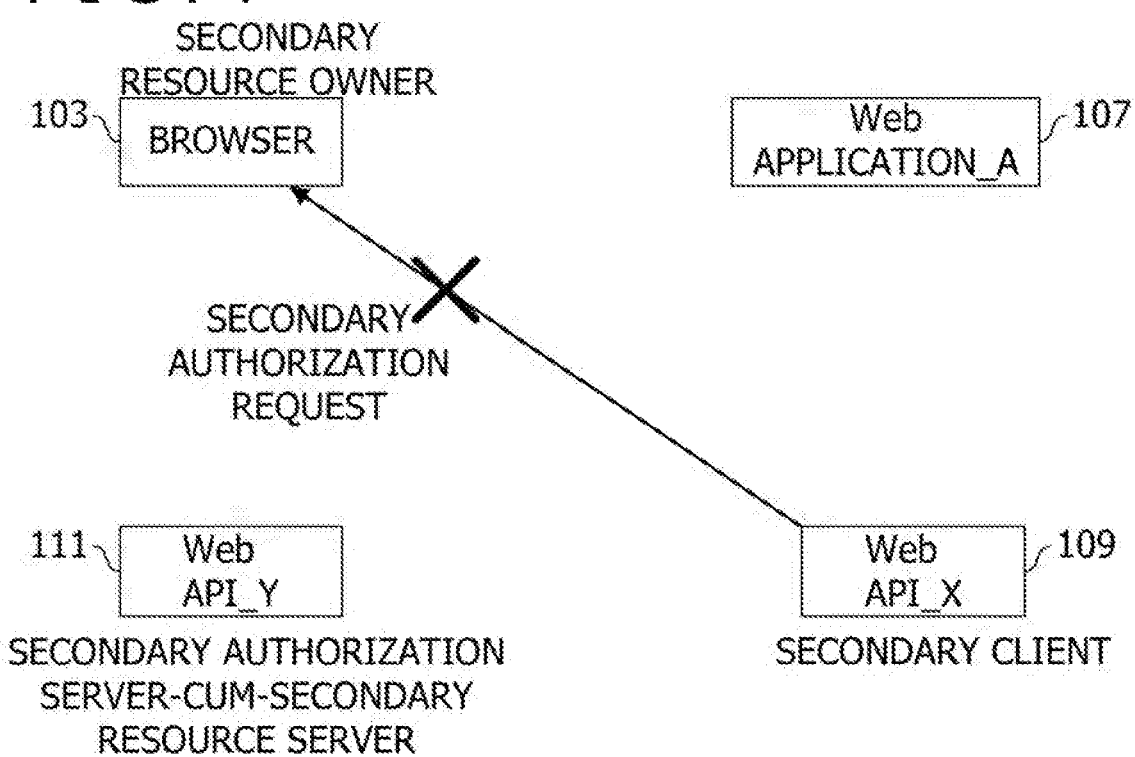
FIG. 4 is a diagram illustrating problems in a secondary authorization.

In the following, problems in the secondary authorization will be described with reference to FIG. 4. Incidentally, entities, programs, processing, screens, data, parameters, and the like related to the secondary authorization are provided with the word "secondary" to be differentiated from entities, programs, processing, screens, data, parameters, and the like related to the primary authorization.

A procedure of the secondary authorization in the present example is also compliant with OAuth. A program in the present example is applied to entities in OAuth. The browser 103 is a resource owner in the secondary authorization (for example, a secondary resource owner). The Web API_X 109 is a client in the secondary authorization (for example, a secondary client). The Web API_Y 111 is an authorization server in the secondary authorization (for example, a secondary authorization server). The Web API_Y 111 is, further, a resource server in the secondary authorization (for example, a secondary resource server).

As described in the procedure of the above-described primary authorization, according to the existing technology, an authorization request is sent to a caller. Hence, when this mechanism is applied to the secondary authorization, the secondary authorization request is sent to the Web application_A 107. However, the Web application_A 107 is not the secondary resource owner. It is therefore difficult for the Web application_A 107 to make a response related to the secondary authorization. The secondary authorization request is inherently to be sent to the browser 103 as the secondary resource owner. However, there is no such mechanism in related art.

Figure 5:
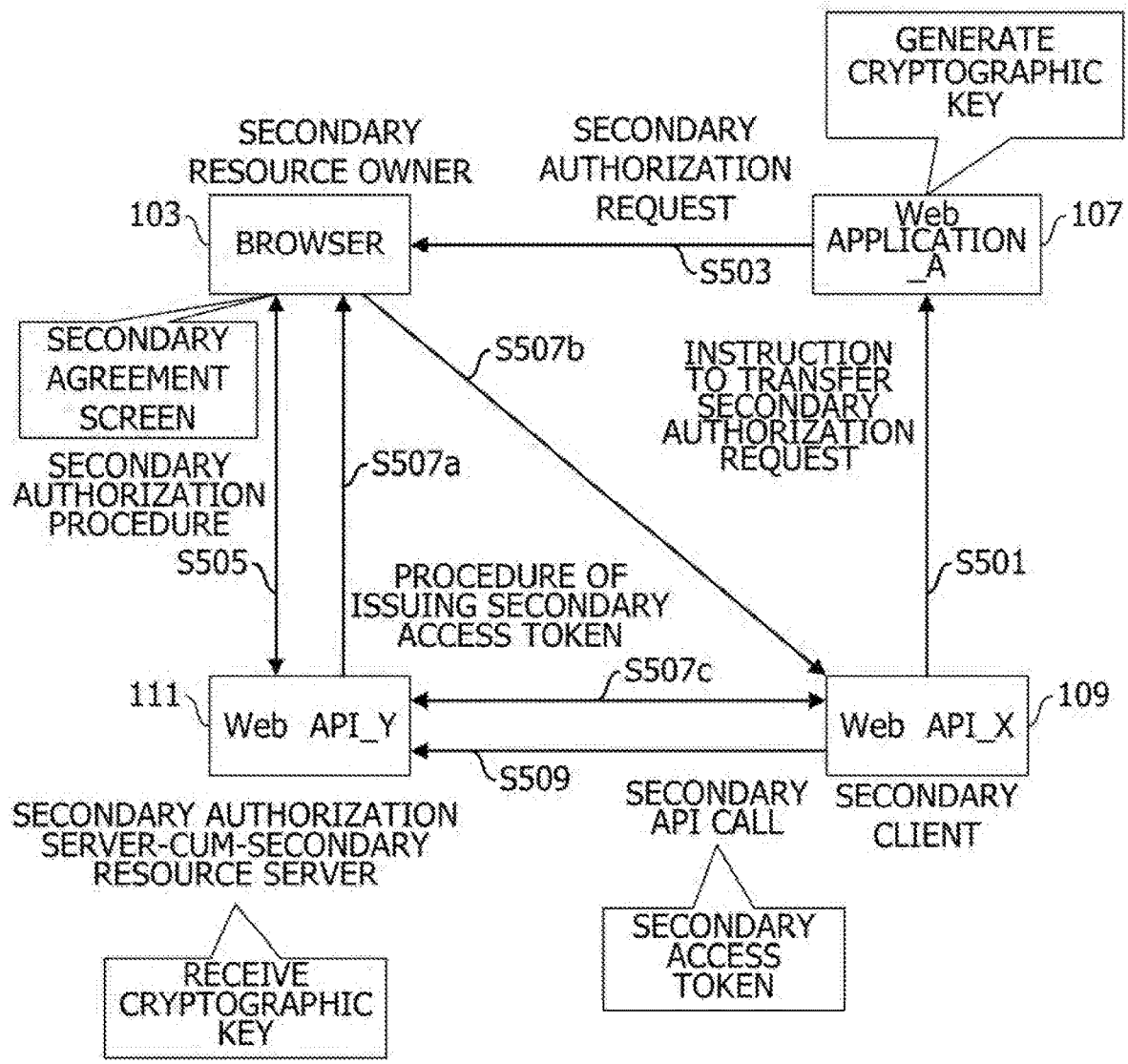
FIG. 5 is a diagram illustrating an outline of a secondary authorization and a secondary API call.

Referring to FIG. 5, description will be made of an outline of a secondary authorization and a secondary API call in the present embodiment. The Web API_X 109 sends an instruction to transfer the secondary authorization request to the Web application_A 107 as a caller (S501). The Web application_A 107 itself generates a cryptographic key, and adds the generated cryptographic key to the secondary authorization request. The Web application_A 107 transfers the secondary authorization request having the cryptographic key added thereto to the browser 103 according to the transfer instruction (S503).

When the browser 103 receives the secondary authorization request having the cryptographic key added thereto, a procedure of the secondary authorization is performed between the browser 103 and the Web API_Y 111 (S505). The Web API_Y 111 receives the secondary authorization by this procedure. Incidentally, in the procedure of the secondary authorization, a secondary agreement screen is displayed on the browser 103. In addition, the Web API_Y 111 retains the received cryptographic key.

FIG. 6 illustrates an example of the secondary agreement screen. As described above, "AAA" is the name of the Web application_A 107. Similarly, "XXX" is the name of the Web API_X 109. "YYY" is the name of the Web API_Y 111.

As illustrated in FIG. 6, a comment is displayed which includes contents for confirming an agreement about the calling of the secondary resource server by the primary resource server as the secondary client, the primary resource server being called by the primary client. When an authorization button displaying "AUTHORIZE" is selected, it means that the user authorizes the calling of the Web API_Y 111 by the Web API_X 109 called by the Web application_A 107. When a rejection button displaying "REJECT" is selected, on the other hand, it means that the user rejects the calling of the Web API_Y 111 by the Web API_X 109 called by the Web application_A 107.

The description returns to FIG. 5. When the Web API_Y 111 receives the secondary authorization, the Web API_Y 111 issues a secondary access token. The secondary access token is handed over to the Web API_X 109. In the present embodiment, description will be made of an example in which the secondary access token is issued by the authorization code grant method in OAuth. In the present example, an authorization code is sent from the Web API_Y 111 to the Web API_X 109 via the browser 103 (S507*a* and S507*b*), and thereafter the secondary access token is sent based on the authorization code (S507*c*).

Obtaining the secondary access token, the Web API_X 109 calls the Web API_Y 111 with the secondary access token (S509). The Web API_Y 111 confirms that the secondary access token is valid, and provides a service based on a command function of the called Web API_Y 111.

A data main body of a response generated by the service of the Web API_Y 111 and sent to the Web API_X 109 is encrypted by using the retained cryptographic key. Then, the encrypted data is included in a response from the Web API_X 109 to the Web application_A 107.

The Web application_A 107 decrypts the encrypted data included in the response received by the Web application_A 107 by using the previously generated cryptographic key. Thus, the data main body of the response from the Web API_Y 111 is encrypted in a relay process, and the contents of the data main body may be made secret from the Web API_X 109, for example.

Figure 7:
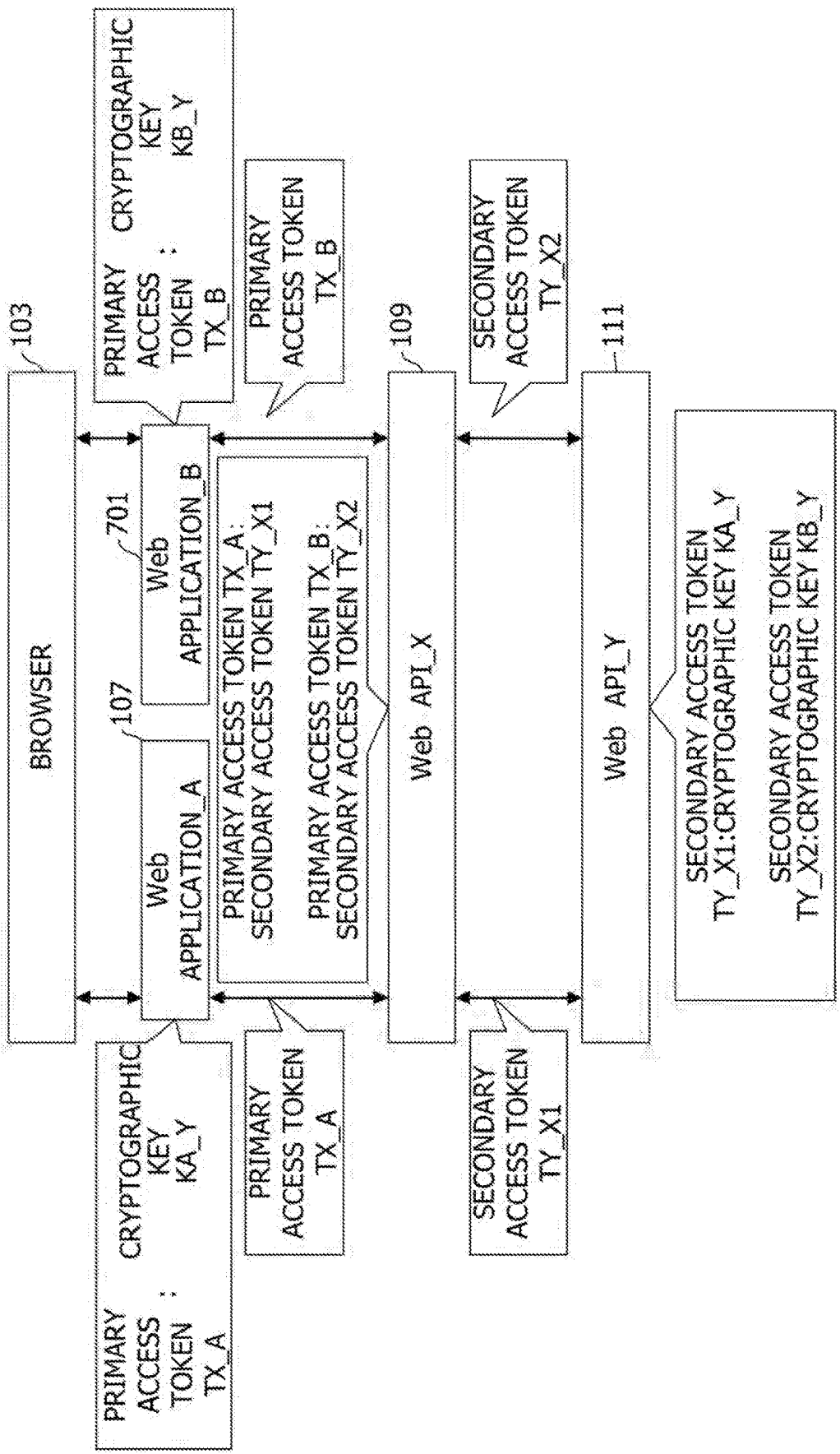
FIG. 7 is a diagram illustrating an outline of association regarding access tokens and cryptographic keys.

Description will next be made of association regarding access tokens and cryptographic keys. FIG. 7 illustrates an outline of association regarding access tokens and cryptographic keys. As described above, the Web application_A 107 uses the Web API_X 109 when performing processing in response to a request from the browser 103, and the Web API_X 109 being used further uses the Web API_Y 111. At this time, the Web API_X 109 issues TX_A as a primary access token to the Web application_A 107. In addition, the Web API_Y 111 issues TY_X1 as a secondary access token to the Web API_X 109.

When the Web application_A 107 generates a cryptographic key KA_Y to be used by the Web API_Y 111, the Web application_A 107 stores the cryptographic key KA_Y in association with the primary access token TX_A used for access to the Web API_X 109.

In addition, when the Web API_Y 111 issues the secondary access token TY_X1 to the Web API_X 109, the Web API_Y 111 stores the cryptographic key KA_Y received in the procedure of the secondary authorization in association with the secondary access token TY_X1.

When the Web API_X 109 obtains the secondary access token TY_X1, the Web API_X 109 associates the primary access token TX_A indicated in a call as a trigger for obtaining the secondary access token TY_X1 with the secondary access token TY_X1.

Assuming the above-described association, the Web API_Y 111 encrypts a data main body of a secondary response by the cryptographic key KA_Y corresponding to the secondary access token TY_X1, and then sends the secondary response to the Web API_X 109. The Web API_X 109 generates a primary response including the encrypted data, and sends the primary response to the Web application_A 107.

The Web application_A 107 decrypts the encrypted data included in the primary response using the cryptographic key KA_Y corresponding to the primary access token TX_A used for access to the Web API_X 109.

When the Web application_A 107 thereafter calls the Web API_X 109 with the primary access token TX_A again, the Web API_X 109 calls the Web API_Y 111 with the secondary access token TY_X1 corresponding to TX_A. Encryption and decryption are thereafter performed in a similar manner.

Meanwhile, suppose that a Web application_B 701 uses the Web API_X 109 when performing processing in response to a request from the browser 103, and that the Web API_X 109 being used further uses the Web API_Y 111. At this time, the Web API_X 109 issues TX_B as a primary access token to the Web application_B 701. In addition, the Web API_Y 111 issues TY_X2 as a secondary access token to the Web API_X 109.

When the Web application_B 701 generates a cryptographic key KB_Y to be used by the Web API_Y 111, the Web application_B 701 stores the cryptographic key KB_Y in association with the primary access token TX_B used for access to the Web API_X 109.

In addition, when the Web API_Y 111 issues the secondary access token TY_X2 to the Web API_X 109, the Web API_Y 111 stores the cryptographic key KB_Y received in the procedure of the secondary authorization in association with the secondary access token TY_X2.

When the Web API_X 109 obtains the secondary access token TY_X2, the Web API_X 109 associates the primary access token TX_B indicated in a call as a trigger for obtaining the secondary access token TY_X2 with the secondary access token TY_X2.

Assuming the above-described association, the Web API_Y 111 encrypts a data main body of a secondary response by the cryptographic key KB_Y corresponding to the secondary access token TY_X2, and then sends the secondary response to the Web API_X 109. The Web API_X 109 generates a primary response including the encrypted data, and sends the primary response to the Web application_B 701.

The Web application_B 701 decrypts the encrypted data included in the primary response using the cryptographic key KB_Y corresponding to the primary access token TX_B used for access to the Web API_X 109.

When the Web application_B 701 thereafter calls the Web API_X 109 with the primary access token TX_B again, the Web API_X 109 calls the Web API_Y 111 with the secondary access token TY_X2 corresponding to TX_B. Encryption and decryption are thereafter performed in a similar manner.

Thus, the data main bodies of the secondary responses from the Web API_Y 111 are unknown and secret in other than the applications as starting points. For example, the Web application_B 701 does not obtain the contents of the secondary response sent to the Web application_A 107. Conversely, the Web application_A 107 does not obtain the contents of the secondary response sent to the Web application_B 701.

Incidentally, there is also an aspect of being able to distinguish an access right according to the contents of the comment presented on the secondary agreement screen. If the user refuses on the secondary agreement screen involved in the operation of the Web application_B 701, the Web API_X 109 does not use the secondary access token TY_X1 even when the Web API_X 109 retains the secondary access token. For example, the secondary access token TY_X1 is not used because the secondary access token TY_X1 is based on authorization in the operation of the Web application_A 107. This concludes the description of the outline in the present embodiment.

Figure 8A:
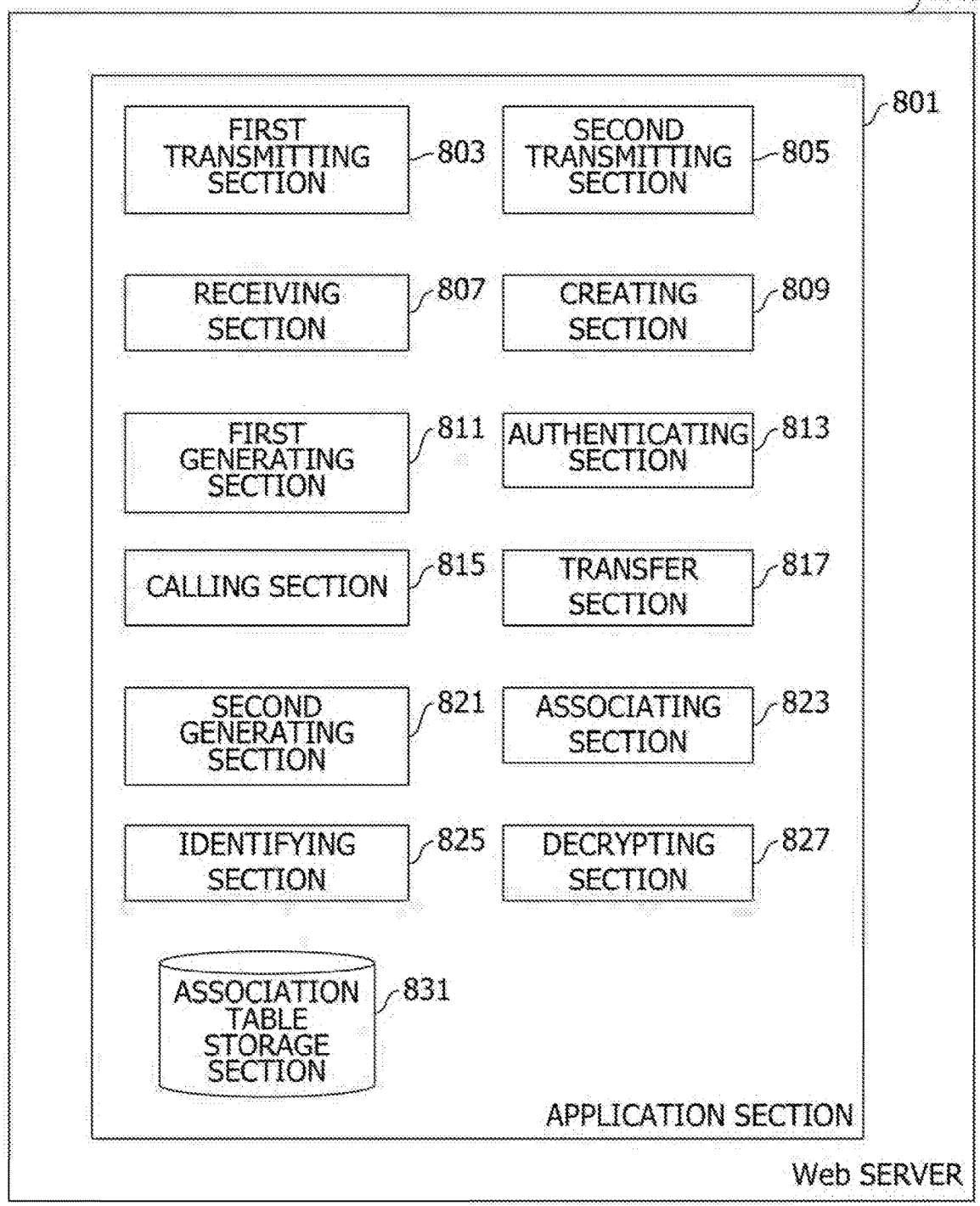
FIG. 8A is a diagram illustrating an example of a module configuration of an application section.

Operation in the present embodiment will be described in detail in the following. As illustrated in FIG. 8A, the Web server 105a includes an application section 801. The application section 801 is implemented by a central processing unit (CPU) processing instructions included in a program of the Web application_A 107.

A module configuration of the application section 801 will be described with reference to FIG. 8A. The application section 801 includes a first transmitting section 803, a second transmitting section 805, a receiving section 807, a creating section 809, a first generating section 811, an authenticating section 813, a calling section 815, and a transfer section 817.

The first transmitting section 803 transmits various kinds of data to the browser 103. The second transmitting section 805 transmits various kinds of data to the Web API_X 109. The receiving section 807 receives various kinds of data. The creating section 809 creates an HTML file. The first generating section 811 generates a primary random number. The authenticating section 813 authenticates a primary local state. The primary local state is data identifying a primary authorization request. Spoofing is made difficult by authenticating the local state in accordance with the specifications of OAuth. The calling section 815 performs a primary API call. The transfer section 817 transfers a secondary authorization request to the browser 103.

The application section 801 further includes a second generating section 821, an associating section 823, an identifying section 825, a decrypting section 827, and an association table storage section 831.

The second generating section 821 generates a cryptographic key. The associating section 823 associates the cryptographic key with a primary access token. The identifying section 825 identifies the cryptographic key based on a first association table. The decrypting section 827 decrypts encrypted data included in a response from a primary API. The association table storage section 831 stores the first association table.

FIG. 8B illustrates an example of the first association table. A record in the first association table includes a field storing a primary access token and a field storing a cryptographic key. The cryptographic key is generated in the second generating section 821. The primary access token is an access token used in a primary API call as a trigger for generating the cryptographic key.

The application section 801, the first transmitting section 803, the second transmitting section 805, the receiving section 807, the creating section 809, the first generating section 811, the authenticating section 813, the calling section 815, the transfer section 817, the second generating section 821, the associating section 823, the identifying section 825, and the decrypting section 827 described above are implemented by using hardware resources (for example, FIG. 27) and an application program that makes a CPU perform processing to be described in the following.

Figure 27:
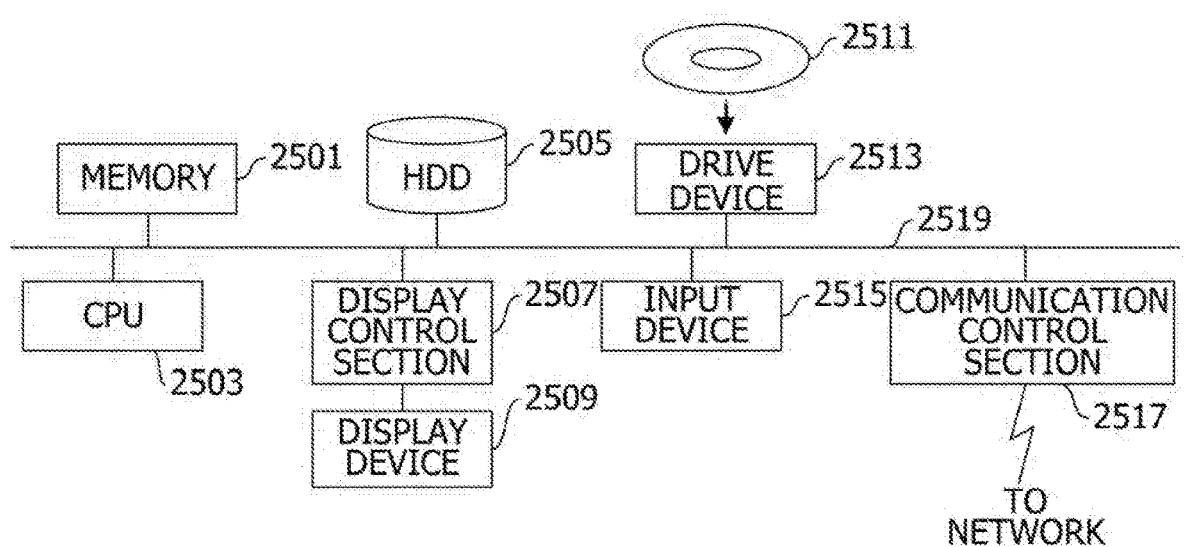
FIG. 27 is a functional block diagram of a computer.

The association table storage section 831 described above is implemented by using hardware resources (for example, FIG. 27).

Figure 9:
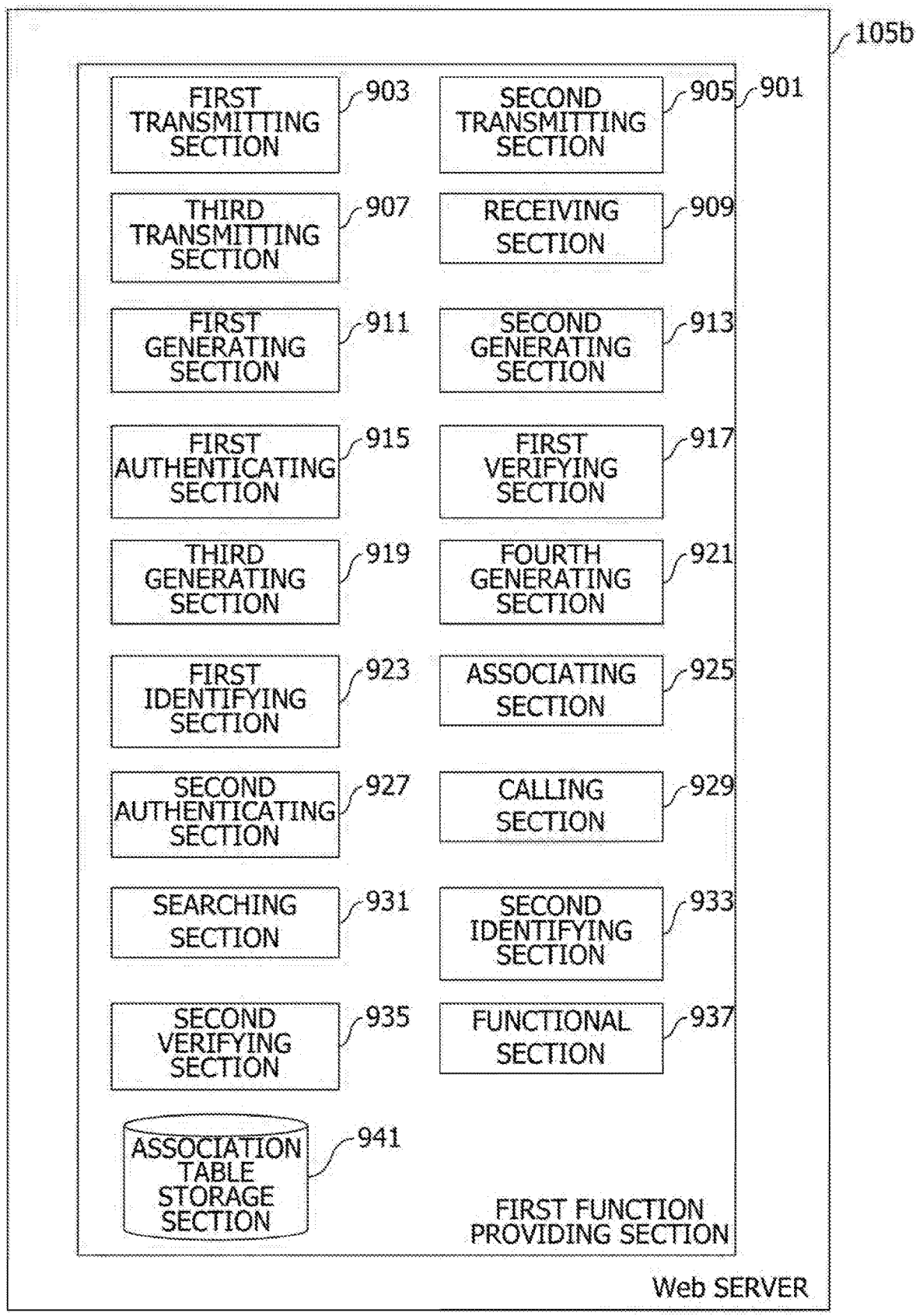
FIG. 9 is a diagram illustrating an example of a module configuration of a first function providing section.

As illustrated in FIG. 9, the Web server 105b includes a first function providing section 901. The first function providing section 901 is implemented by a CPU processing instructions included in a program of the Web API_X 109.

A module configuration of the first function providing section 901 will be described with reference to FIG. 9. The first function providing section 901 includes a first transmitting section 903, a second transmitting section 905, a third transmitting section 907, a receiving section 909, a first generating section 911, a second generating section 913, a first authenticating section 915, a first verifying section 917, a third generating section 919, a fourth generating section 921, a first identifying section 923, an associating section 925, a second authenticating section 927, a calling section 929, a searching section 931, a second identifying section 933, a second verifying section 935, a functional section 937, and an association table storage section 941.

The first transmitting section 903 transmits various kinds of data to the browser 103. The second transmitting section 905 transmits various kinds of data to the Web application_A 107. The third transmitting section 907 transmits various kinds of data to the Web API_Y 111. The receiving section 909 receives various kinds of data.

The first generating section 911 generates data of a primary agreement screen. The second generating section 913 generates a primary authorization code. The authorization code is data as a precondition for obtaining an access token based on the specifications of OAuth. The first authenticating section 915 authenticates the primary client. The first verifying section 917 verifies the primary authorization code. The third generating section 919 generates a primary access token. The fourth generating section 921 generates a secondary random number. The first identifying section 923 identifies a primary client name based on a primary client identifier (ID). The associating section 925 generates a second association table. The second association table is stored in the association table storage section 941. The second association table will be described later with reference to FIG. 15.

The second authenticating section 927 authenticates a secondary local state. The secondary local state is data identifying a secondary authorization request. Spoofing is made difficult by authenticating the local state in accordance with the specifications of OAuth. The calling section 929 performs a secondary API call. The searching section 931 searches for a secondary access token in the second association table. The second identifying section 933 identifies a callback uniform resource locator (URL) based on the primary client ID. Incidentally, the second identifying section 933 will be described in a second embodiment.

The second verifying section 935 verifies the primary access token. The functional section 937 performs processing for implementing a command function of the Web API_X 109.

The first function providing section 901, the first transmitting section 903, the second transmitting section 905, the third transmitting section 907, the receiving section 909, the first generating section 911, the second generating section 913, the first authenticating section 915, the first verifying section 917, the third generating section 919, the fourth generating section 921, the first identifying section 923, the associating section 925, the second authenticating section 927, the calling section 929, the searching section 931, the second identifying section 933, the second verifying section 935, and the functional section 937 described above are implemented by using hardware resources (for example, FIG. 27) and a Web API program that makes a CPU perform processing to be described in the following.

The association table storage section 941 described above is implemented by using hardware resources (for example, FIG. 27).

Figure 10:
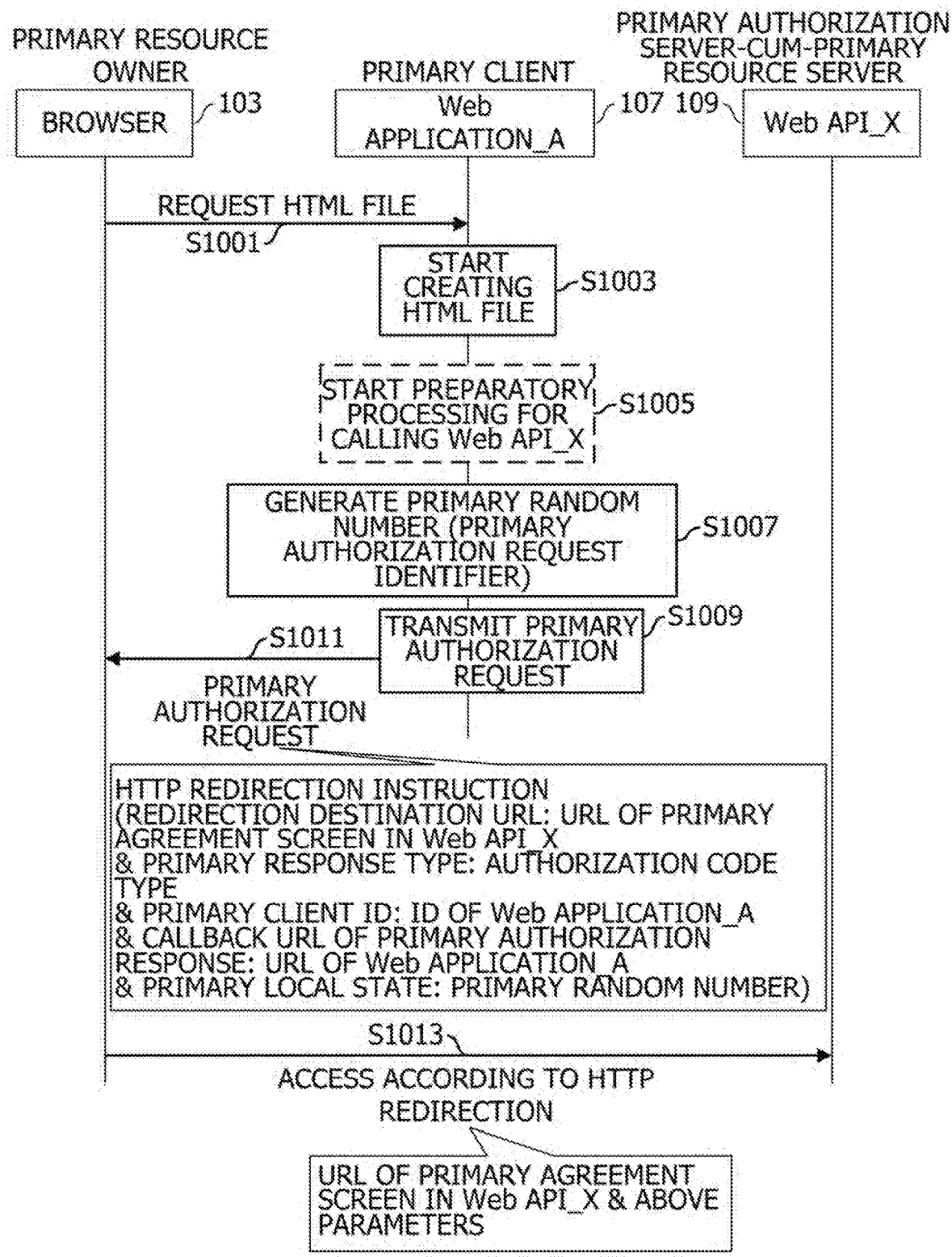
FIG. 10 is a diagram illustrating a sequence example of a primary authorization.

Description will next be made of sequences in the present embodiment. FIG. 10 illustrates a sequence example of a primary authorization. When the receiving section 807 of the application section 801 corresponding to the Web application_A 107 receives an HTML file request sent from the browser 103 (S1001), the creating section 809 of the application section 801 corresponding to the Web application_A 107 starts processing of creating an HTML file (S1003).

In a case where the Web API_X 109 is to be used in the processing of creating the HTML file, the application section 801 corresponding to the Web application_A 107 starts preparatory processing for calling the Web API_X 109 (S1005). Processing from S1007 on down corresponds to the preparatory processing for calling the Web API_X 109.

The first generating section 811 of the application section 801 corresponding to the Web application_A 107 generates a primary random number (S1007). The primary random number is used as an identifier of a primary authorization request.

The first transmitting section 803 of the application section 801 corresponding to the Web application_A 107 transmits the primary authorization request to the browser 103 as a transmission source of the HTML file request in S1001 (S1009). For example, the primary authorization request is a hypertext transfer protocol (HTTP) redirection instruction. A redirection destination URL is the URL of a primary agreement screen in the Web API_X 109. A primary response type, a primary client ID, the callback URL of a primary authorization response, and a primary local state are added as parameters to the redirection destination URL.

In the case of the authorization code grant method, an authorization code type is set as the primary response type. The primary client ID in the present example is the ID of the Web application_A 107. The callback URL of the primary authorization response corresponds to the destination of the primary authorization response. The callback URL of the primary authorization response in the present example is the URL of the Web application_A 107. A primary random number is set as the primary local state. The primary local state is data identifying the primary authorization request, and is used to maintain consistency of exchanges in the primary authorization according to the specifications of OAuth. A value not easily estimated is used to make spoofing by a third party difficult.

When the browser 103 receives the primary authorization request (S1011), the browser 103 accesses the URL of the primary agreement screen in the Web API_X 109 according to an HTTP redirection (S1013). At this time, the above-described parameters added to the URL of the primary agreement screen in the Web API_X 109 are also handed over. The processing proceeds to a sequence illustrated in FIG. 11.

Description will be made of FIG. 11. FIG. 11 is a diagram illustrating a sequence example of the primary authorization. The first generating section 911 of the first function providing section 901 corresponding to the Web API_X 109 generates the data of the primary agreement screen (S1101). At this time, the first generating section 911 of the first function providing section 901 corresponding to the Web API_X 109 sets the program name of the primary client (the program name of the primary client will hereinafter be referred to as a primary client name) and the program name of the primary resource server (the program name of the primary resource server will hereinafter be referred to as a primary resource server name) in a comment of the primary agreement screen. The primary client name is identified based on the primary client ID. Incidentally, the first function providing section 901 corresponding to the Web API_X 109 retains the primary client name in association with the primary client ID in advance. Then, the first transmitting section 903 of the first function providing section 901 corresponding to the Web API_X 109 transmits the data of the primary agreement screen to the browser 103 as an access source (S1103).

When the browser 103 receives the data of the primary agreement screen (S1105), the browser 103 displays the primary agreement screen (S1107). When the authorization button is selected on the primary agreement screen, the browser 103 receives a primary authorization (S1109). According to the mechanism of the primary agreement screen, the browser 103 transmits a primary authorization notification to the Web API_X 109 (S1111).

Figure 12:
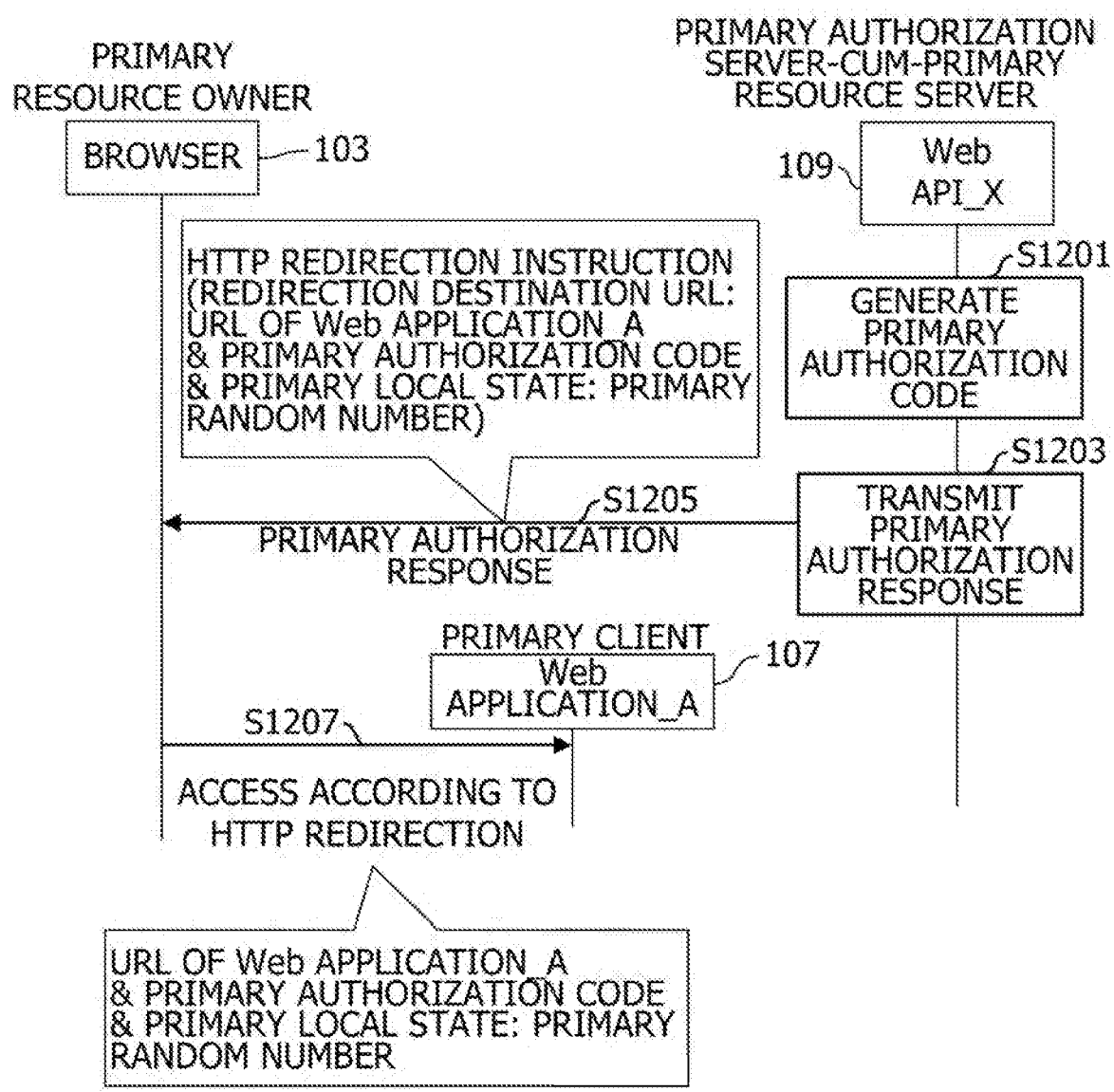
FIG. 12 is a diagram illustrating a sequence example of a primary authorization.

When the receiving section 909 of the first function providing section 901 corresponding to the Web API_X 109 receives the primary authorization notification (S1113), the processing proceeds to a sequence illustrated in FIG. 12.

Description will be made of FIG. 12. FIG. 12 is a diagram illustrating a sequence example of the primary authorization. The second generating section 913 of the first function providing section 901 corresponding to the Web API_X 109 generates a primary authorization code (S1201). The generation of the primary authorization code is based on an existing technology.

The first transmitting section 903 of the first function providing section 901 corresponding to the Web API_X 109 transmits a primary authorization response to the browser 103 as a transmission source of the primary authorization notification (S1203). For example, the primary authorization response is an HTTP redirection instruction. A redirection destination URL is the callback URL of the primary authorization response (the URL of the Web application_A 107 in the present example). The primary authorization code and the primary local state are added as parameters to the redirection destination URL.

When the browser 103 receives the primary authorization response (S1205), the browser 103 accesses the URL of the Web application_A 107 according to an HTTP redirection (S1207). At this time, the above-described parameters added to the URL of the Web application_A 107 are also handed over. The processing proceeds to a sequence illustrated in FIG. 13.

Figure 13:
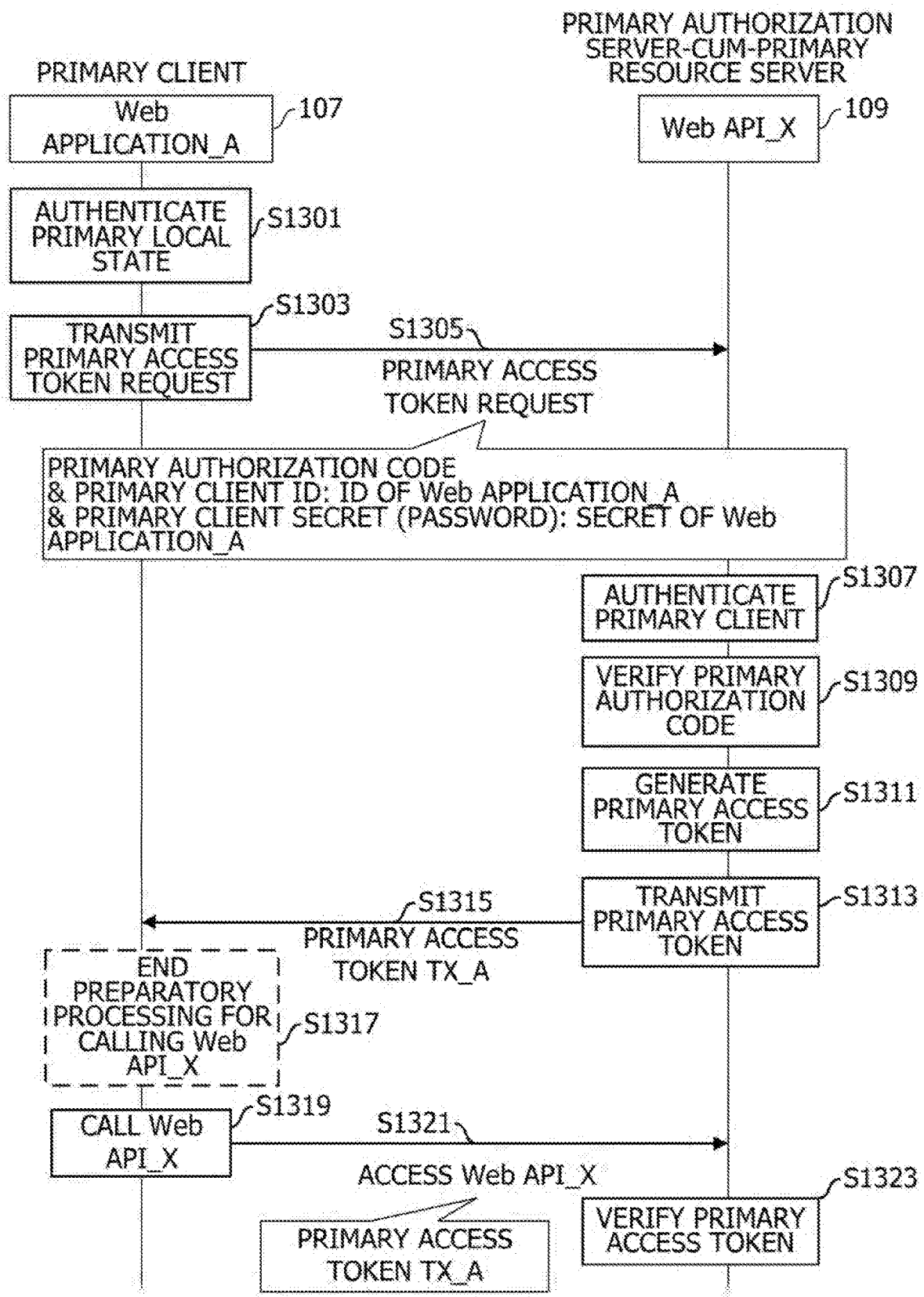
FIG. 13 is a diagram illustrating a sequence example of a primary authorization and a primary API call.

Description will be made of FIG. 13. FIG. 13 is a diagram illustrating a sequence example of the primary authorization and a primary API call. The authenticating section 813 of the application section 801 corresponding to the Web application_A 107 authenticates the primary local state (S1301). For example, the authentication of the primary local state succeeds when the primary local state included in the primary authorization request in S1009 of FIG. 10 and the primary local state handed over in S1207 of FIG. 12 coincide with each other. The processing is discontinued when the authentication of the primary local state fails. Suppose in the present example that the authentication of the primary local state succeeds.

The second transmitting section 805 of the application section 801 corresponding to the Web application_A 107 transmits a primary access token request based on the primary authorization code to the Web API_X 109 (S1303). The primary client ID and a primary client secret are added to the primary authorization code. The secret corresponds to a password. For example, the primary client ID and the primary client secret are primary credentials. The primary client ID in the present example is the ID of the Web application_A 107. The primary client secret in the present example is the secret of the Web application_A 107.

When the receiving section 909 of the first function providing section 901 corresponding to the Web API_X 109 receives the primary access token request (S1305), the first authenticating section 915 of the first function providing section 901 corresponding to the Web API_X 109 authenticates the primary client based on the primary client ID and the primary client secret (S1307). When the authentication of the primary client fails, the processing is discontinued. Suppose in the present example that the authentication of the primary client succeeds.

The first verifying section 917 of the first function providing section 901 corresponding to the Web API_X 109 verifies the primary authorization code (S1309). When the primary authorization code is valid, the verification of the primary authorization code succeeds. When the verification of the primary authorization code fails, the processing is discontinued. Suppose in the present example that the verification of the primary authorization code succeeds.

The third generating section 919 of the first function providing section 901 corresponding to the Web API_X 109 generates a primary access token (S1311). A method of generating the primary access token is based on an existing technology.

The second transmitting section 905 of the first function providing section 901 corresponding to the Web API_X 109 transmits the primary access token to the Web application_A 107 as a transmission source of the primary access token request (S1313). Suppose in this case that TX_A as the primary access token is transmitted.

When the receiving section 807 of the application section 801 corresponding to the Web application_A 107 receives TX_A as the primary access token (S1315), the application section 801 corresponding to the Web application_A 107 ends the preparatory processing for calling the Web API_X 109 (S1317). The calling section 815 of the application section 801 corresponding to the Web application_A 107 calls the Web API_X 109 (S1319). TX_A as the primary access token is transferred at a time of access to the Web API_X 109.

When the receiving section 909 of the first function providing section 901 corresponding to the Web API_X 109 receives access to the Web API_X 109 (S1321), the second verifying section 935 of the first function providing section 901 corresponding to the Web API_X 109 verifies the primary access token (S1323). When the primary access token is valid, the verification of the primary access token succeeds. When the verification of the primary access token fails, the processing is discontinued. Suppose in the present example that the verification of the primary access token succeeds.

When the verification of the primary access token succeeds, the functional section 937 of the first function providing section 901 corresponding to the Web API_X 109 starts processing for implementing a command function related to the access. The processing then proceeds to a sequence illustrated in FIG. 14A.

Description will be made of FIG. 14A. The processing proceeds from here to secondary authorization sequences. In a case where the Web API_Y 111 is to be used in processing for implementing the above-described command function, the first function providing section 901 corresponding to the Web API_X 109 starts preparatory processing for calling the Web API_Y 111 (S1401). Processing from S1403 on down corresponds to the preparatory processing for calling the Web API_Y 111.

The fourth generating section 921 of the first function providing section 901 corresponding to the Web API_X 109 generates a secondary random number (S1403). The secondary random number is used as an identifier of a secondary authorization request.

The first identifying section 923 of the first function providing section 901 corresponding to the Web API_X 109 identifies the primary client name based on the primary client ID (S1405). The primary client name in the present example is the name "AAA" of the Web application_A 107.

The second transmitting section 905 of the first function providing section 901 corresponding to the Web API_X 109 transmits an instruction to transfer the secondary authorization request to the Web application_A 107 as a caller of the Web API_X 109 (S1407). For example, the secondary authorization request is an HTTP redirection instruction. A redirection destination URL is the URL of a secondary agreement screen in the Web API_Y 111. A secondary response type, a secondary client ID, the callback URL of a secondary authorization response, and a secondary local state are added as parameters to the redirection destination URL.

In the case of the authorization code grant method, an authorization code type is set as the secondary response type. The secondary client ID in the present example is the ID of the Web API_X 109. The callback URL of the secondary authorization response corresponds to the destination of the secondary authorization response. The callback URL of the secondary authorization response in the present example is the URL of the Web API_X 109. A combination of the secondary random number and the primary client name is set as the secondary local state. For example, in the present example, a part of the secondary local state is used to transmit the primary client name. However, only the secondary random number may be set as the secondary local state, and the primary client name may be transmitted as another parameter.

The associating section 925 of the first function providing section 901 corresponding to the Web API_X 109 associates the local state (S1409). For example, the associating section 925 creates a new record in the second association table, and sets the primary access token, the URL of the secondary resource server, and the secondary local state (combination of the secondary random number and the primary client name) in the record. Set in the present example are TX_A as the primary access token, the URL of the Web API_Y 111 as the URL of the secondary resource server, and RX_A as the secondary random number and AAA as the primary client name.

FIG. 15 illustrates an example of the second association table. The second association table in the present example includes a record corresponding to a secondary authorization. The record in the second association table includes a field storing the primary access token, a field storing the URL of the secondary resource server, a field storing the combination of the secondary random number and the primary client name as the secondary local state, a field storing a secondary authorization code, and a field storing a secondary access token.

Figure 14A:
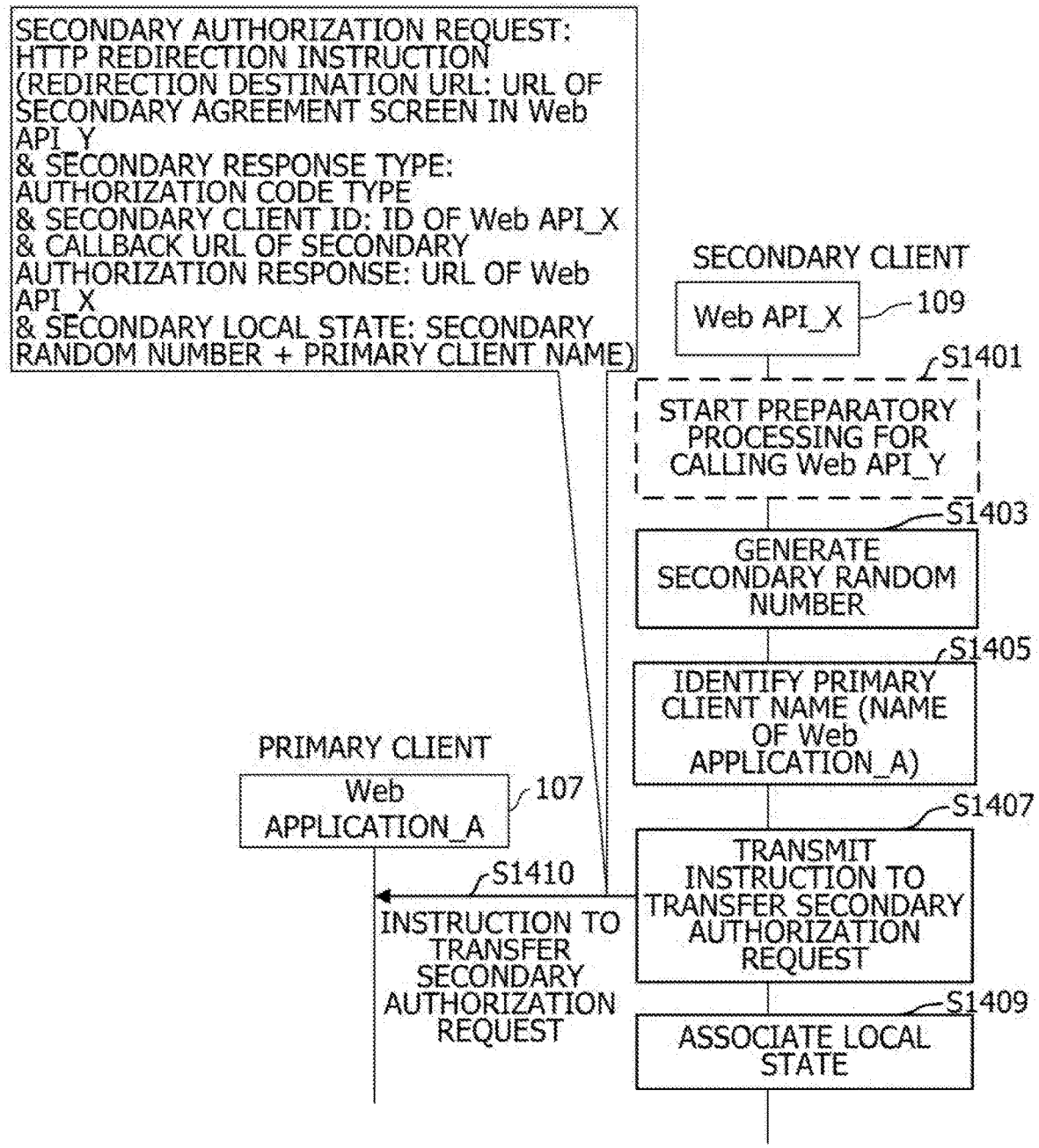
FIG. 14A is a diagram illustrating a sequence example of a secondary authorization.
Figure 14B:
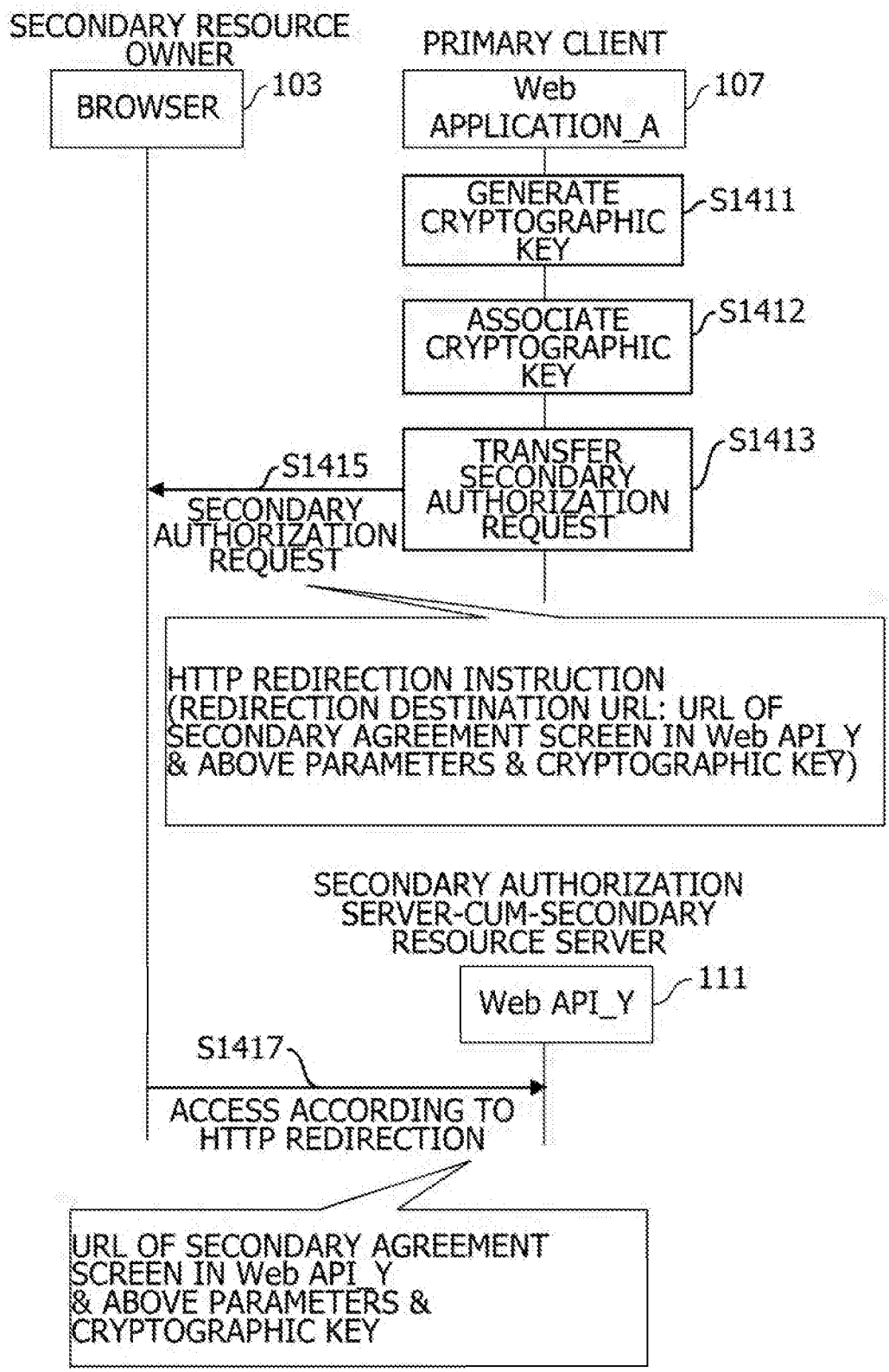
FIG. 14B is a diagram illustrating a sequence example of a secondary authorization.

The description returns to FIG. 14A. After the receiving section 807 of the application section 801 corresponding to the Web application_A 107 receives the instruction to transfer the secondary authorization request (S1410), the processing proceeds to a sequence illustrated in FIG. 14B. FIG. 14B is a diagram illustrating a sequence example of a secondary authorization.

The second generating section 821 of the application section 801 corresponding to the Web application_A 107 generates a cryptographic key KA_Y (S1411). The cryptographic key generated by the second generating section 821 in the present example is a common key in a symmetric encryption system. In a case where an asymmetric encryption system is adopted, an encryption key and a decryption key corresponding to the encryption key may be generated. In either of the symmetric encryption system and the asymmetric encryption system, the key used for decryption is adapted to the key used for encryption.

The associating section 823 of the application section 801 corresponding to the Web application_A 107 associates the cryptographic key generated in S1411 with the primary access token TX_A transferred to the Web API_X 109 in the calling of the Web API_X 109 as illustrated in S1321 in FIG. 13 (S1412). For example, the associating section 823 creates a new record in the first association table, and stores the primary access token TX_A and the cryptographic key KA_Y in the record. In the case where the asymmetric encryption system is adopted, the associating section 823 may store the decryption key.

The transfer section 817 of the application section 801 corresponding to the Web application_A 107 transfers the received secondary authorization request to the browser 103 as the transmission source of the HTML file request in S1001 in FIG. 10 (S1413). At this time, the transfer section 817 of the application section 801 corresponding to the Web application_A 107 also adds the cryptographic key as a parameter to the secondary authorization request in addition to the above-described parameters (the secondary response type, the secondary client ID, the callback URL of the secondary authorization response, and the secondary local state). In the case where the asymmetric encryption system is adopted, the transfer section 817 may add the encryption key.

When the browser 103 receives the secondary authorization request (S1415), the browser 103 accesses the URL of the secondary agreement screen in the Web API_Y 111 according to an HTTP redirection (S1417). At this time, the above-described parameters (the secondary response type, the secondary client ID, the callback URL of the secondary authorization response, and the secondary local state) added to the URL of the secondary agreement screen in the Web API_Y 111 and the cryptographic key are also handed over.

Here, the description of sequences will be temporarily discontinued, and description will be made of modules in the Web server 105c.

Figure 16A:
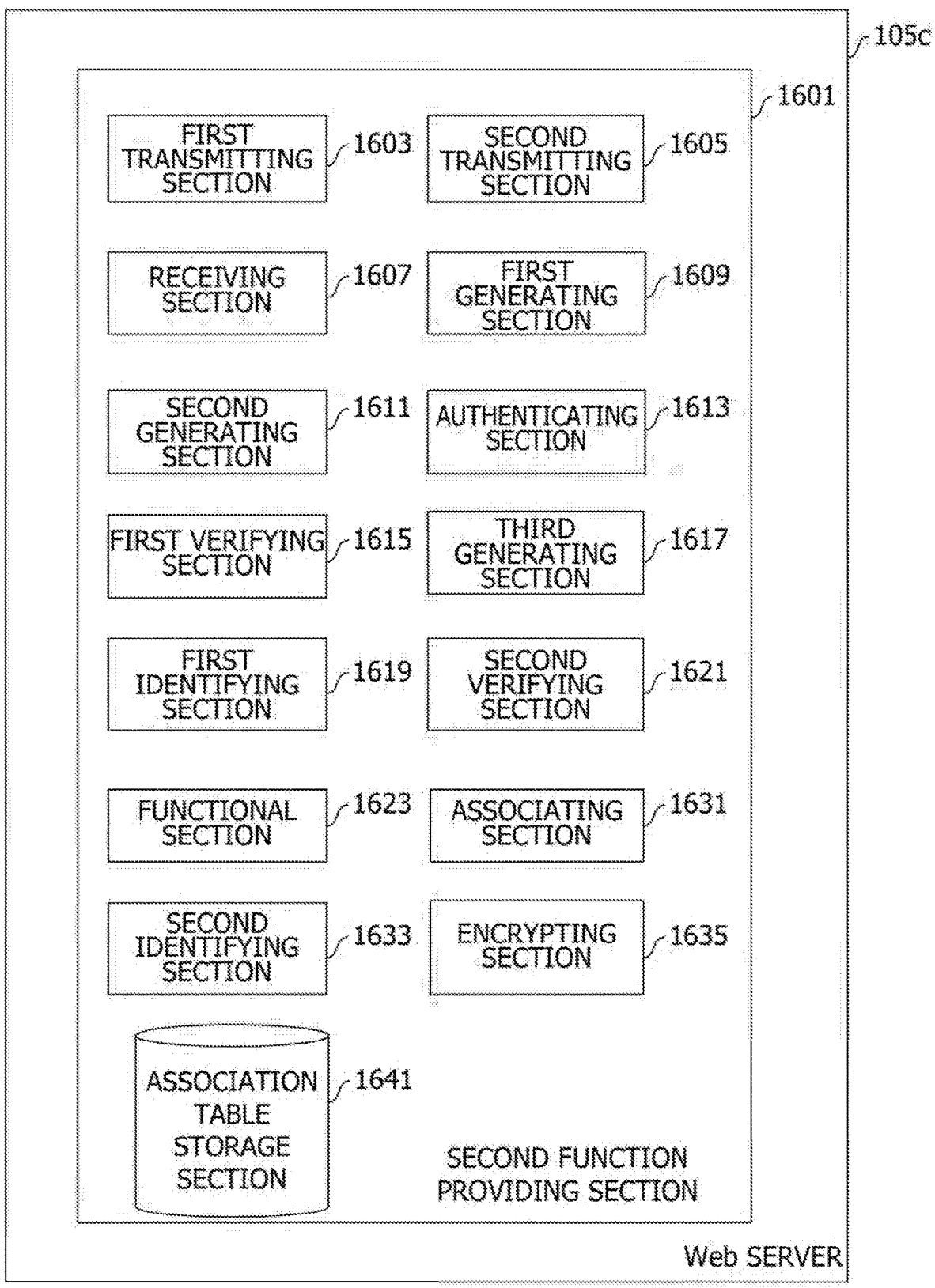
FIG. 16A is a diagram illustrating an example of a module configuration of a second function providing section.

As illustrated in FIG. 16A, the Web server 105c includes a second function providing section 1601. The second function providing section 1601 is implemented by a CPU processing instructions included in a program of the Web API_Y 111.

A module configuration of the second function providing section 1601 will be described with reference to FIG. 16A. FIG. 16A illustrates an example of a module configuration of the second function providing section 1601. The second function providing section 1601 includes a first transmitting section 1603, a second transmitting section 1605, a receiving section 1607, a first generating section 1609, a second generating section 1611, an authenticating section 1613, a first verifying section 1615, a third generating section 1617, a first identifying section 1619, a second verifying section 1621, and a functional section 1623.

The first transmitting section 1603 transmits various kinds of data to the browser 103. The second transmitting section 1605 transmits various kinds of data to the Web API_X 109. The receiving section 1607 receives various kinds of data. The first generating section 1609 generates data of the secondary agreement screen. The second generating section 1611 generates a secondary authorization code. The authenticating section 1613 authenticates the secondary client. The first verifying section 1615 verifies the secondary authorization code. The third generating section 1617 generates a secondary access token. The first identifying section 1619 identifies a callback URL based on the secondary client ID. The second verifying section 1621 verifies the secondary access token. The functional section 1623 performs processing for implementing a command function of the Web API_Y 111.

The second function providing section 1601 further includes an associating section 1631, a second identifying section 1633, an encrypting section 1635, and an association table storage section 1641.

The associating section 1631 associates the cryptographic key with the secondary access token. The second identifying section 1633 identifies the cryptographic key based on a third association table. The encrypting section 1635 encrypts the data main body of an API response by using the cryptographic key. The association table storage section 1641 stores the third association table.

FIG. 16B illustrates an example of the third association table. A record in the third association table includes a field storing a secondary access token and a field storing a cryptographic key. The cryptographic key is the one handed over in access to the Web API_Y 111 as illustrated in S1417 in FIG. 14B. The secondary access token is an access token issued with the access as a trigger.

The second function providing section 1601, the first transmitting section 1603, the second transmitting section 1605, the receiving section 1607, the first generating section 1609, the second generating section 1611, the authenticating section 1613, the first verifying section 1615, the third generating section 1617, the first identifying section 1619, the second verifying section 1621, the functional section 1623, the associating section 1631, the second identifying section 1633, and the encrypting section 1635 described above are implemented by using hardware resources (for example, FIG. 27) and a Web API program that makes a CPU perform processing to be described in the following.

The association table storage section 1641 described above is implemented by using hardware resources (for example, FIG. 27).

Figure 17:
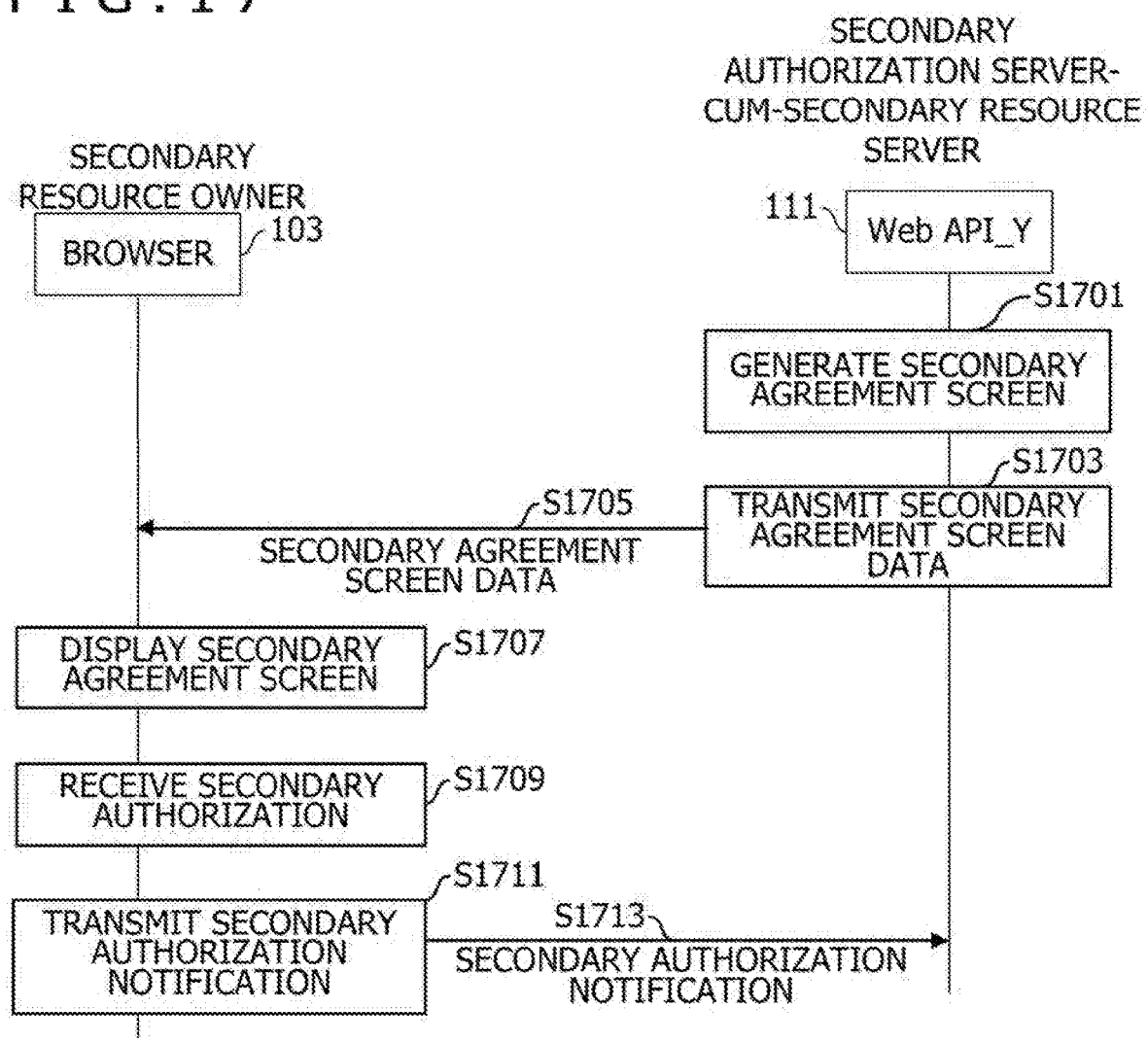
FIG. 17 is a diagram illustrating a sequence example of a secondary authorization.

The description returns to sequences. The processing proceeds from the sequence illustrated in FIG. 14B to a sequence illustrated in FIG. 17. FIG. 17 is a diagram illustrating a sequence example of a secondary authorization. The first generating section 1609 of the second function providing section 1601 corresponding to the Web API_Y 111 generates the data of a secondary agreement screen (S1701). At this time, the first generating section 1609 of the second function providing section 1601 corresponding to the Web API_Y 111 sets the primary client name, the program name of the secondary client as the primary resource server (the program name of the secondary client will hereinafter be referred to as a secondary client name), and the program name of the secondary resource server (the program name of the secondary resource server will hereinafter be referred to as a secondary resource server name) in a comment of the secondary agreement screen. The primary client name is extracted from the secondary local state. The secondary client name is identified based on the secondary client ID. Incidentally, the second function providing section 1601 corresponding to the Web API_Y 111 retains the secondary client name in association with the secondary client ID in advance. Then, the first transmitting section 1603 of the second function providing section 1601 corresponding to the Web API_Y 111 transmits the data of the secondary agreement screen to the browser 103 as an access source (S1703).

When the browser 103 receives the data of the secondary agreement screen (S1705), the browser 103 displays the secondary agreement screen (S1707). When the authorization button is selected on the secondary agreement screen, the browser 103 receives a secondary authorization (S1709). According to the mechanism of the secondary agreement screen, the browser 103 transmits a secondary authorization notification to the Web API_Y 111 (S1711).

Figure 18:
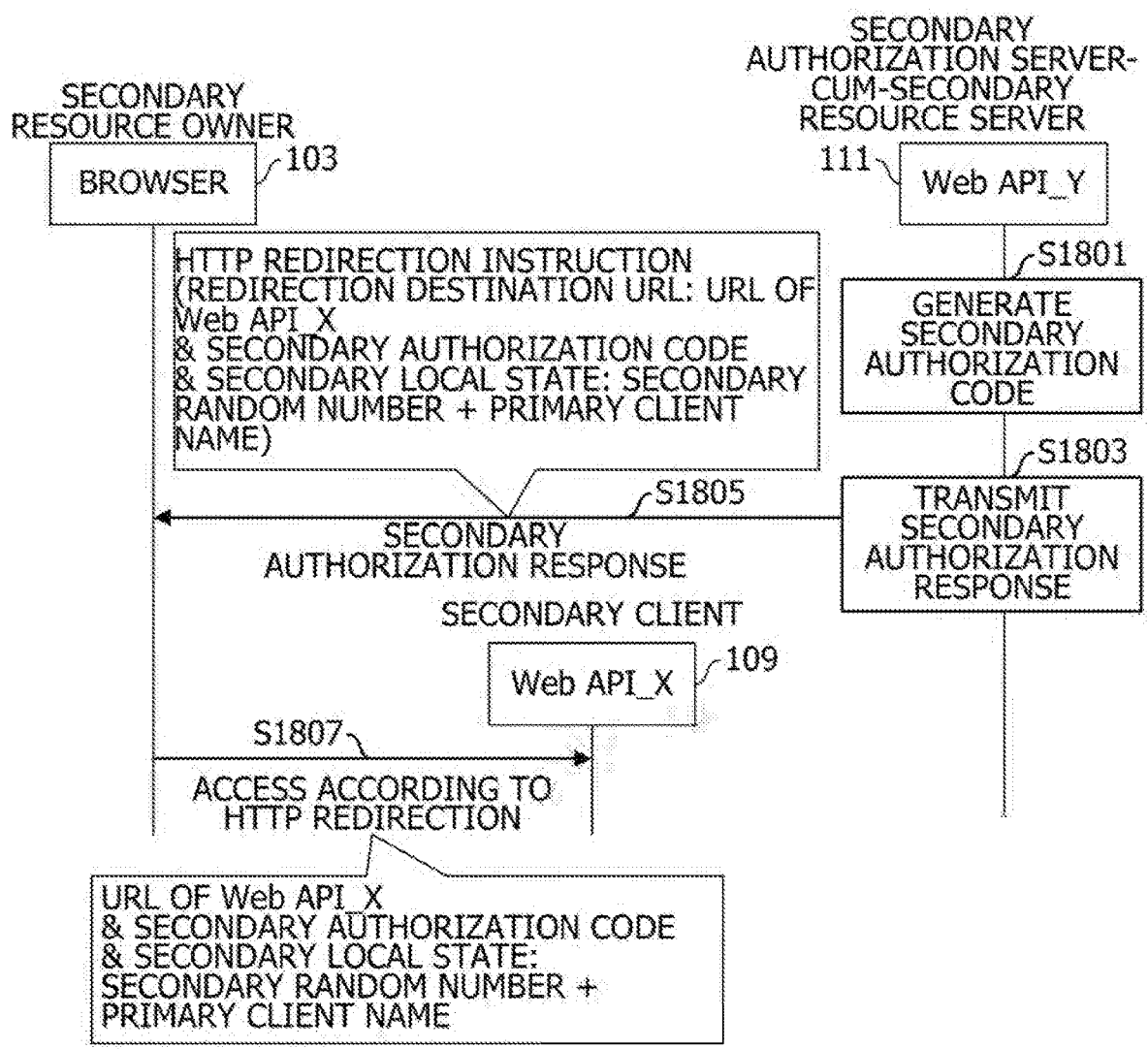
FIG. 18 is a diagram illustrating a sequence example of a secondary authorization.

When the receiving section 1607 of the second function providing section 1601 corresponding to the Web API_Y 111 receives the secondary authorization notification (S1713), the processing proceeds to a sequence illustrated in FIG. 18.

Description will be made of FIG. 18. FIG. 18 is a diagram illustrating a sequence example of a secondary authorization. The second generating section 1611 of the second function providing section 1601 corresponding to the Web API_Y 111 generates a secondary authorization code (S1801). The generation of the secondary authorization code is based on an existing technology.

The first transmitting section 1603 of the second function providing section 1601 corresponding to the Web API_Y 111 transmits a secondary authorization response to the browser 103 as a transmission source of the secondary authorization notification (S1803). For example, the secondary authorization response is an HTTP redirection instruction. A redirection destination URL is the callback URL of the secondary authorization response (the URL of the Web API_X 109 in the present example). The secondary authorization code and the secondary local state are added as parameters to the redirection destination URL.

The browser 103 receives the secondary authorization response (S1805). The browser 103 accesses the URL of the Web API_X 109 according to an HTTP redirection (S1807). At this time, the above-described parameters added to the URL of the Web API_X 109 are also handed over. The processing proceeds to a sequence illustrated in FIG. 19A.

Description will be made of FIG. 19A. FIG. 19A is a diagram illustrating a sequence example of a secondary authorization and a secondary API call. The second authenticating section 927 of the first function providing section 901 corresponding to the Web API_X 109 authenticates the secondary local state (S1901). The authentication of the secondary local state succeeds when the secondary local state included in the secondary authorization request in S1407 in FIG. 14A and the secondary local state handed over in S1807 in FIG. 18 coincide with each other. When the authentication of the secondary local state fails, the processing is discontinued. Suppose in the present example that the authentication of the secondary local state succeeds.

The associating section 925 of the first function providing section 901 corresponding to the Web API_X 109 associates the secondary authorization code (S1903). For example, the associating section 925 of the first function providing section 901 corresponding to the Web API_X 109 sets the secondary authorization code in the record created in S1409. At this time, the associating section 925 of the first function providing section 901 corresponding to the Web API_X 109 may identify the record based on the secondary local state. Thus, the secondary authorization code is consequently associated with the primary access token.

The third transmitting section 907 of the first function providing section 901 corresponding to the Web API_X 109 transmits a secondary access token request based on the secondary authorization code to the Web API_Y 111 (S1905). The secondary client ID and a secondary client secret are added to the secondary authorization code. The secondary client ID and the secondary client secret are secondary credentials. The secondary client ID in the present example is the ID of the Web API_X 109. The secondary client secret in the present example is the secret of the Web API_X 109.

When the receiving section 1607 of the second function providing section 1601 corresponding to the Web API_Y 111 receives the secondary access token request (S1907), the authenticating section 1613 of the second function providing section 1601 corresponding to the Web API_Y 111 authenticates the secondary client based on the secondary client ID and the secondary client secret (S1909). When the authentication of the secondary client fails, the processing is discontinued. Suppose in the present example that the authentication of the secondary client succeeds.

The first verifying section 1615 of the second function providing section 1601 corresponding to the Web API_Y 111 verifies the secondary authorization code (S1911). When the secondary authorization code is valid, the verification of the secondary authorization code succeeds. When the verification of the secondary authorization code fails, the processing is discontinued. Suppose in the present example that the verification of the secondary authorization code succeeds.

The third generating section 1617 of the second function providing section 1601 corresponding to the Web API_Y 111 generates a secondary access token (S1913). A method of generating the secondary access token is based on an existing technology.

The associating section 1631 of the second function providing section 1601 corresponding to the Web API_Y 111 associates the cryptographic key handed over in access according to the HTTP redirection as illustrated in S1417 in FIG. 14B with the secondary access token TY_X1 generated in S1913 (S1914). For example, the associating section 1631 creates a new record in the third association table, and stores the secondary access token TY_X1 and the cryptographic key KA_Y in the record.

The second transmitting section 1605 of the second function providing section 1601 corresponding to the Web API_Y 111 transmits the secondary access token to the Web API_X 109 as a transmission source of the secondary access token request (S1915). Here, suppose that TY_X1 as the secondary access token is transmitted.

Figure 19B:
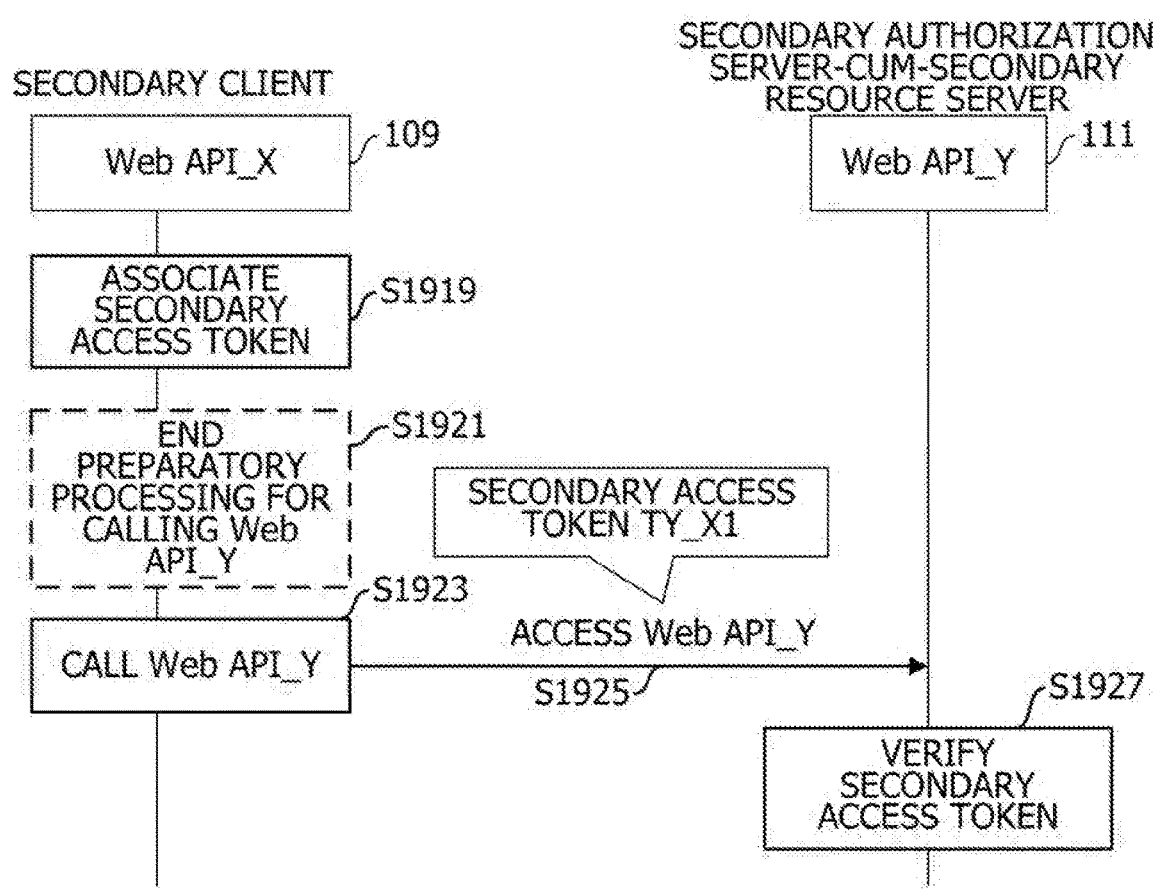
FIG. 19B is a diagram illustrating a sequence example of a secondary authorization and a secondary API call.

After the receiving section 909 of the first function providing section 901 corresponding to the Web API_X 109 receives TY_X1 as the secondary access token (S1917), the processing proceeds to a sequence illustrated in FIG. 19B. FIG. 19B is a diagram illustrating a sequence example of a secondary authorization and a secondary API call.

The associating section 925 of the first function providing section 901 corresponding to the Web API_X 109 associates the secondary access token (S1919). For example, the associating section 925 of the first function providing section 901 corresponding to the Web API_X 109 sets the secondary access token in the record created in S1409. At this time, the associating section 925 of the first function providing section 901 corresponding to the Web API_X 109 may identify the record based on the secondary authorization code. Thus, the secondary access token is consequently associated with the primary access token.

In this stage, the first function providing section 901 corresponding to the Web API_X 109 ends the preparatory processing for calling the Web API_Y 111 (S1921). The calling section 929 of the first function providing section 901 corresponding to the Web API_X 109 calls the Web API_Y 111 (S1923). TY_X1 as the secondary access token is transferred at a time of access to the Web API_Y 111.

When the receiving section 1607 of the second function providing section 1601 corresponding to the Web API_Y 111 receives access to the Web API_Y 111 (S1925), the second verifying section 1621 of the second function providing section 1601 corresponding to the Web API_Y 111 verifies the secondary access token (S1927). When the secondary access token is valid, the verification of the secondary access token succeeds. When the verification of the secondary access token fails, the processing is discontinued. Suppose in the present example that the verification of the secondary access token succeeds.

When the verification of the secondary access token succeeds, the functional section 1623 of the second function providing section 1601 corresponding to the Web API_Y 111 starts processing for implementing a command function in the Web API_Y 111. The processing then proceeds to a sequence illustrated in FIG. 20A.

Figure 20A:
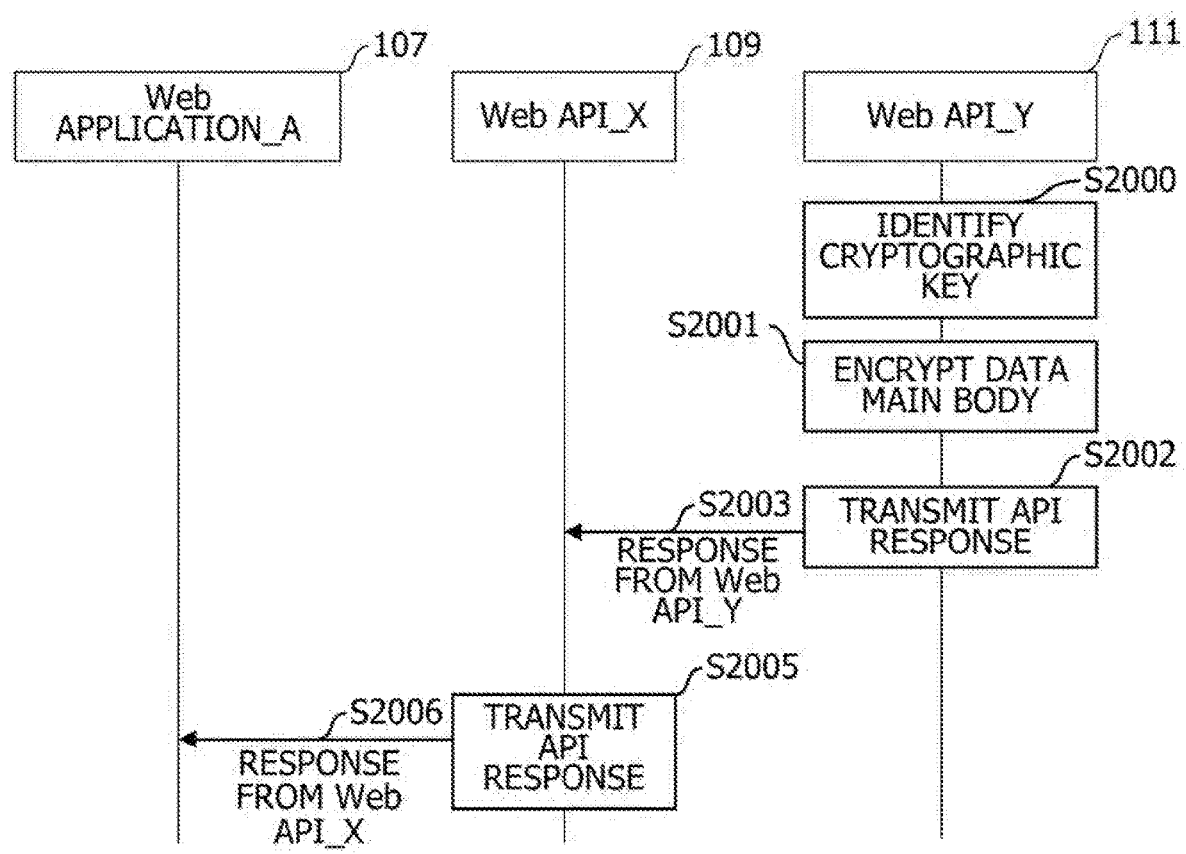
FIG. 20A is a diagram illustrating a sequence example after a secondary API call.

Description will be made of FIG. 20A. FIG. 20A is a diagram illustrating a sequence example after a secondary API call. When the functional section 1623 of the second function providing section 1601 corresponding to the Web API_Y 111 ends the processing for implementing the command function in the Web API_Y 111, the second identifying section 1633 of the second function providing section 1601 corresponding to the Web API_Y 111 identifies a cryptographic key based on the third association table (S2000). For example, the second identifying section 1633 identifies the cryptographic key KA_Y corresponding to the secondary access token TY_X1 transferred in the calling of the API_Y 111 as illustrated in S1925 in FIG. 19B.

The encrypting section 1635 of the second function providing section 1601 corresponding to the Web API_Y 111 encrypts the data main body of an API response by using the identified cryptographic key (S2001). At this time, the encrypting section 1635 encrypts the whole of the data main body, for example. Alternatively, the encrypting section 1635 may encrypt a given part of the data main body according to a policy.

The second transmitting section 1605 of the second function providing section 1601 corresponding to the Web API_Y 111 transmits the encrypted API response to the Web API_X 109 as a caller of the Web API_Y 111 (S2002).

When the receiving section 909 of the first function providing section 901 corresponding to the Web API_X 109 receives the response from the Web API_Y 111 (S2003), the functional section 937 of the first function providing section 901 corresponding to the Web API_X 109 continues the processing for implementing the command function in the Web API_X 109. When the functional section 937 of the first function providing section 901 corresponding to the Web API_X 109 then ends the processing, the second transmitting section 905 of the first function providing section 901 corresponding to the Web API_X 109 transmits the API response to the Web application_A 107 as a caller of the Web API_X 109 (S2005). Suppose that the response sent from the Web API_X 109 at this time includes the encrypted data included in the response from the Web API_Y 111.

Figure 20B:
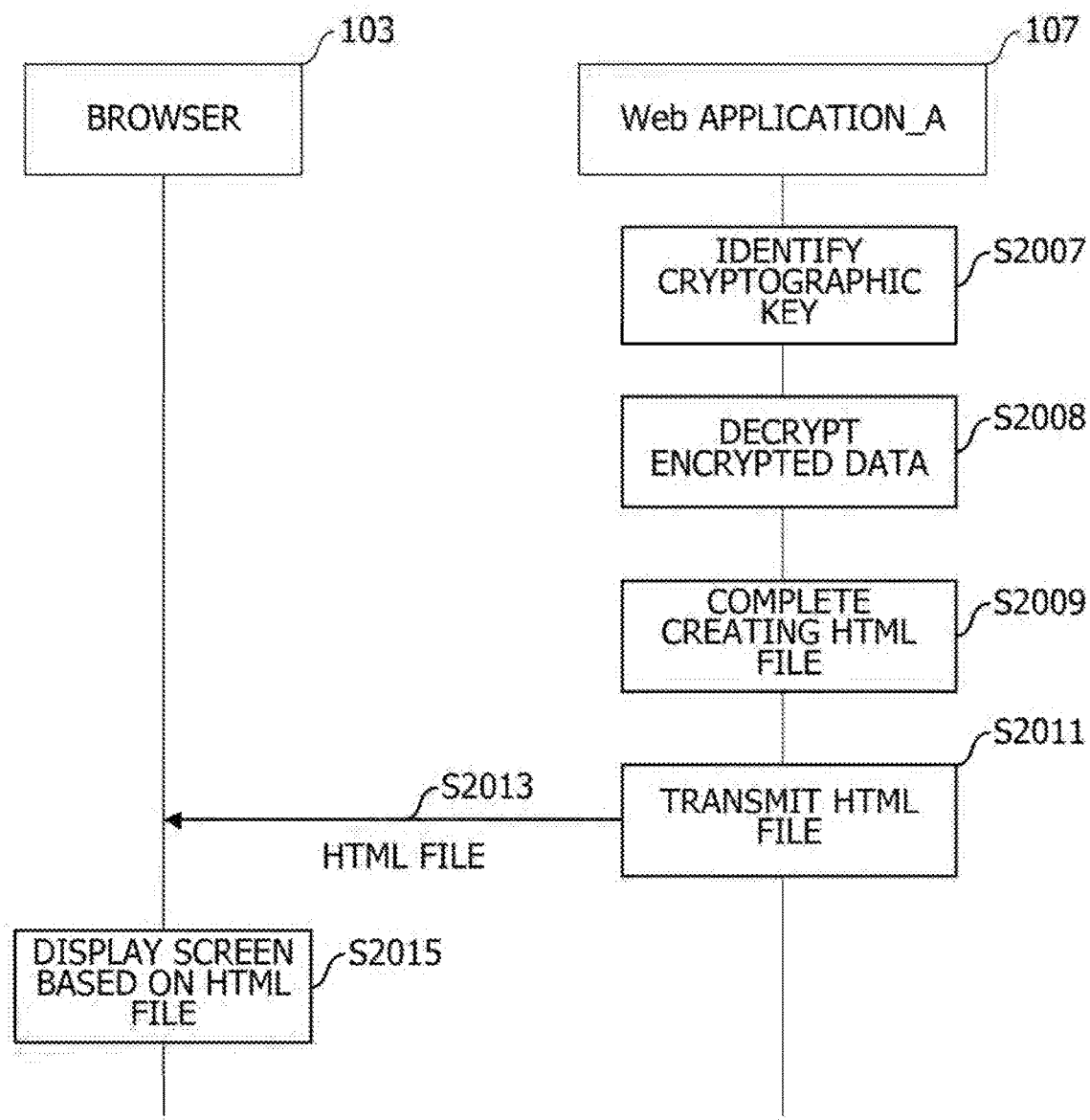
FIG. 20B is a diagram illustrating a sequence example after a secondary API call.

After the receiving section 807 of the application section 801 corresponding to the Web application_A 107 receives the response from the Web API_X 109 (S2006), the processing proceeds to a sequence illustrated in FIG. 20B. FIG. 20B is a diagram illustrating a sequence example after a secondary API call.

The identifying section 825 of the application section 801 corresponding to the Web application_A 107 identifies a cryptographic key based on the first association table (S2007). For example, the identifying section 825 identifies the cryptographic key KA_Y corresponding to the primary access token TX_A transferred in the calling of the API_X 109 as illustrated in S1321 in FIG. 13.

The decrypting section 827 of the application section 801 corresponding to the Web application_A 107 decrypts the encrypted data included in the response from the API_X 109 by using the identified cryptographic key KA_Y (S2008).

The creating section 809 of the application section 801 corresponding to the Web application_A 107 continues the processing of creating the HTML file. When the creating section 809 of the application section 801 corresponding to the Web application_A 107 then ends the processing of creating the HTML file (S2009), the first transmitting section 803 of the application section 801 corresponding to the Web application_A 107 transmits the HTML file to the browser 103 as a request source (S2011).

When the browser 103 receives the HTML file (S2013), the browser 103 makes screen display based on the HTML file (S2015).

When the browser 103 thereafter requests an HTML file as in the previous request, for example, the issuance of the primary access token and the issuance of the secondary access token are omitted. FIG. 21 illustrates a sequence example of a primary API call and a secondary API call for a second and subsequent times.

When the receiving section 807 of the application section 801 corresponding to the Web application_A 107 receives an HTML file request sent from the browser 103 (S2101), the calling section 815 of the application section 801 corresponding to the Web application_A 107 calls the Web API_X 109 using the primary access token (TX_A in the present example) associated with a user account in the Web application_A 107 (S2103).

When the receiving section 909 of the first function providing section 901 corresponding to the Web API_X 109 receives access to the Web API_X 109 (S2105), the second verifying section 935 of the first function providing section 901 corresponding to the Web API_X 109 verifies the primary access token (S2106). Because the primary access token is valid, the first function providing section 901 corresponding to the Web API_X 109 operates normally.

The first function providing section 901 corresponding to the Web API_X 109 proceeds to preparatory processing for calling the Web API_Y 111. The searching section 931 of the first function providing section 901 corresponding to the Web API_X 109 searches for a secondary access token (S2107). For example, the searching section 931 of the first function providing section 901 corresponding to the Web API_X 109 searches the second association table for a record corresponding to the primary access token with the primary access token as a key. Alternatively, with a set of the primary access token and the URL of the secondary resource server as a key, the searching section 931 of the first function providing section 901 corresponding to the Web API_X 109 searches the second association table for a record corresponding to the set. When there is a corresponding record, the secondary access token stored in the record is used. Incidentally, when there is no corresponding record, the processing from S1401 on down as illustrated in FIG. 14A is performed.

In the present example, the calling section 929 of the first function providing section 901 corresponding to the Web API_X 109 calls the Web API_Y 111 using the secondary access token (TY_X1) (S2109).

When the receiving section 1607 of the second function providing section 1601 corresponding to the Web API_Y 111 receives access the Web API_Y 111 (S2111), the second verifying section 1621 of the second function providing section 1601 corresponding to the Web API_Y 111 verifies the secondary access token (S2113). Because the secondary access token is valid, the second function providing section 1601 corresponding to the Web API_Y 111 operates normally.

According to the present embodiment, the response of a secondary function included in the response of a primary function may be concealed.

In addition, because a cryptographic key is added to the URL of an agreement screen related to the usage of the secondary function, processing becomes relatively easy.

Second Embodiment

In the foregoing embodiment, description has been made of an example in which the primary access token is issued by the authorization code grant method in OAuth, and the secondary access token is issued by the same authorization code grant method. However, the primary access token may be issued by another method. In addition, the secondary access token may be issued by another method. In the present embodiment, description will be made of an example in which the primary access token is issued by an implicit grant method in OAuth, and the secondary access token is issued by the same implicit grant method.

Figure 22:
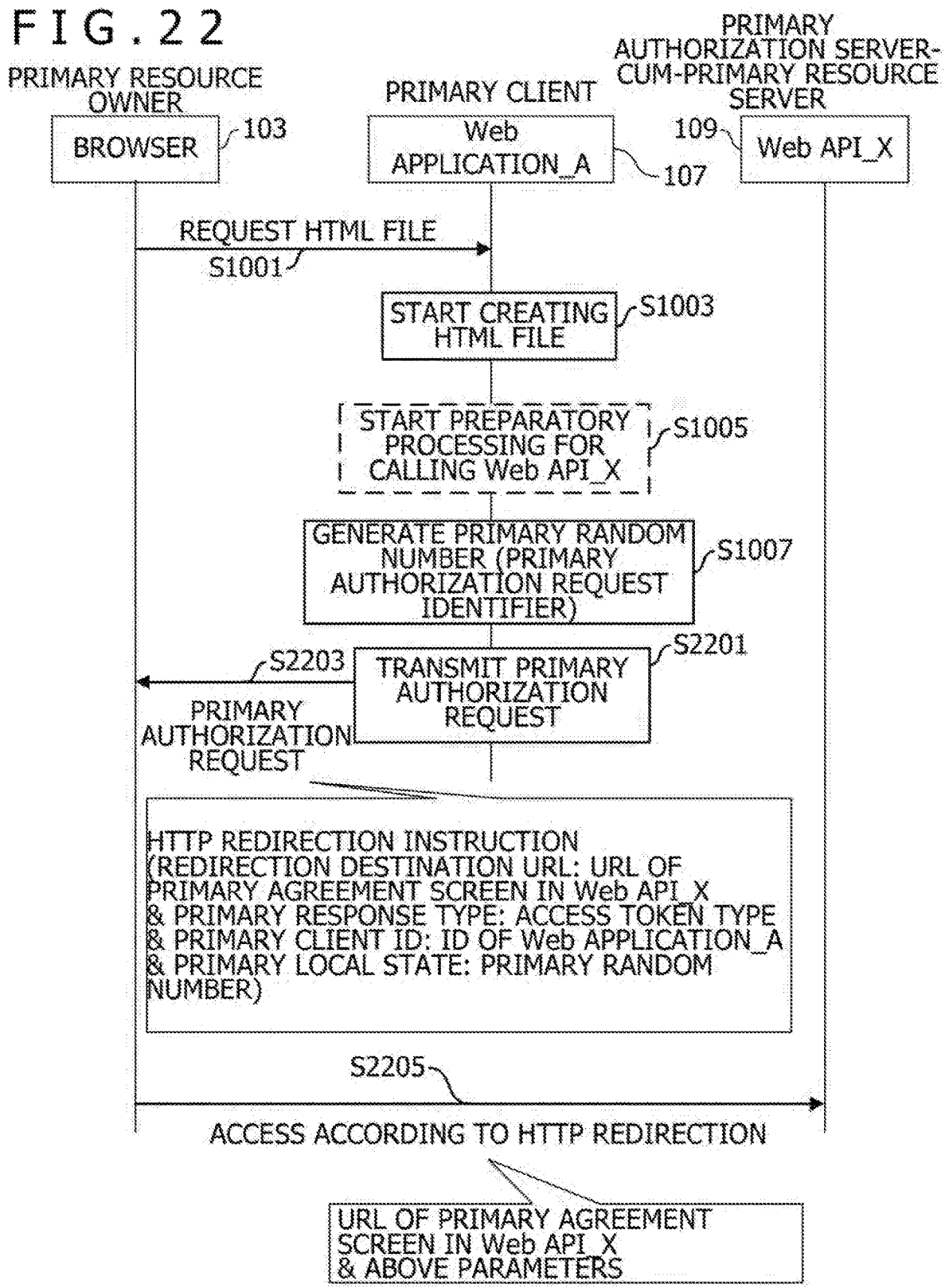
FIG. 22 is a diagram illustrating a sequence example of a primary authorization in a second embodiment.

In the second embodiment, processing in a primary authorization sequence illustrated in FIG. 22 is performed in place of the processing in the primary authorization sequence illustrated in FIG. 10.

Processing illustrated in S1001 to S1007 is similar to that of FIG. 10.

A primary authorization request transmitted by the first transmitting section 803 of the application section 801 corresponding to the Web application_A 107 in S2201 is an HTTP redirection instruction as in the first embodiment. However, in the case of the implicit grant method, an access token type is set as the secondary response type. In addition, the callback URL of the secondary authorization response is omitted.

When the browser 103 receives the primary authorization request including the above-described parameter (S2203), the browser 103 accesses the URL of the primary agreement screen in the Web API_X 109 according to an HTTP redirection (S2205). At this time, the above-described parameters added to the URL of the primary agreement screen in the Web API_X 109 are also handed over. The processing proceeds to the sequence illustrated in FIG. 11.

In the second embodiment, processing similar to that of the primary authorization sequence illustrated in FIG. 11 is performed.

Figure 23:
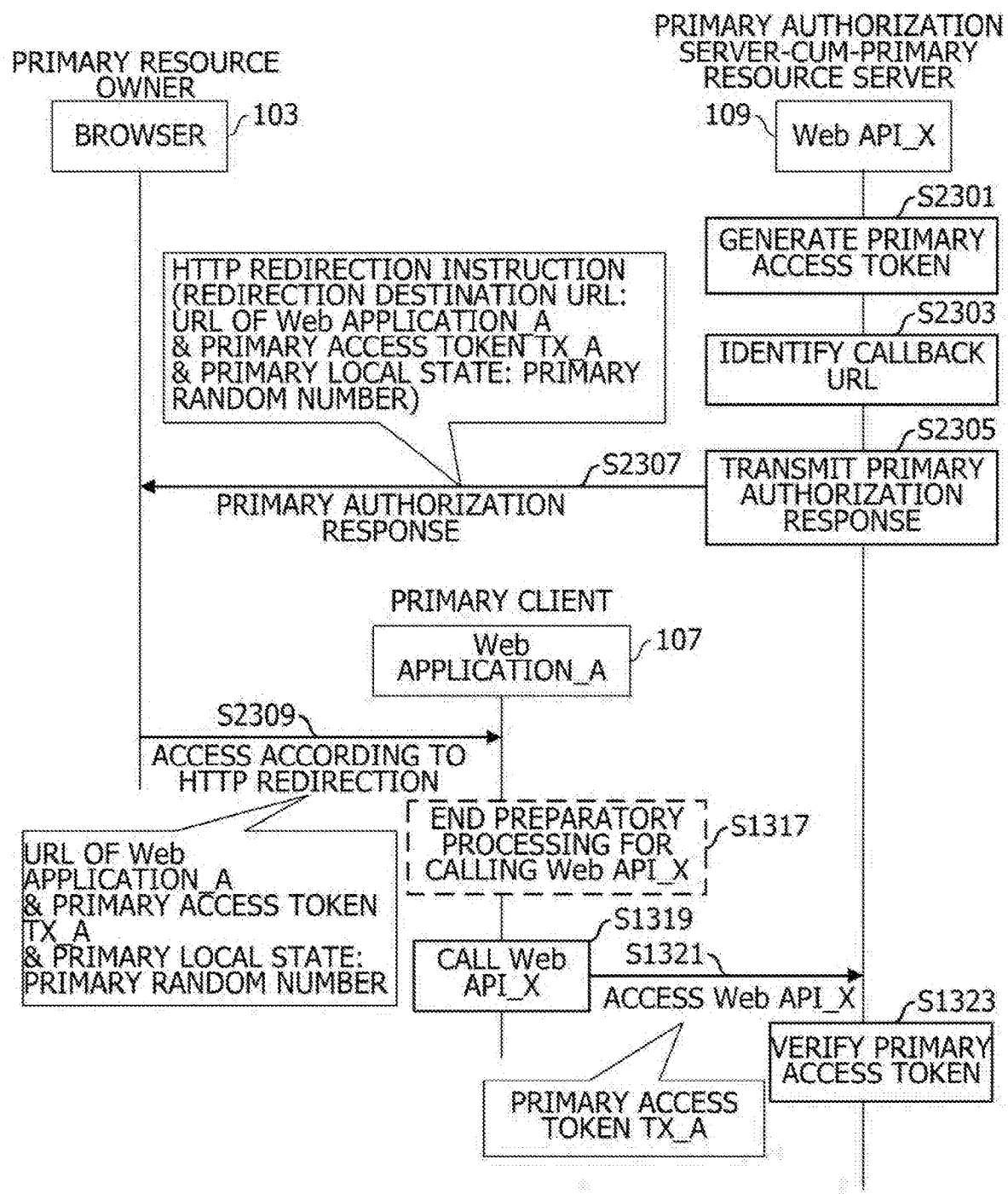
FIG. 23 is a diagram illustrating a sequence example of a primary authorization and a primary API call in the second embodiment.

In the second embodiment, processing in a sequence of a primary authorization and a primary API call illustrated in FIG. 23 is performed in place of the processing in the sequence of the primary authorization and the primary API call illustrated in FIG. 12 and FIG. 13.

The fourth generating section 921 of the first function providing section 901 corresponding to the Web API_X 109 generates a primary access token (S2301). A method of generating the primary access token is based on an existing technology.

The second identifying section 933 of the first function providing section 901 corresponding to the Web API_X 109 identifies a callback URL based on the primary client ID (S2303). The callback URL is the URL of the primary client. Incidentally, suppose that, as in the existing technology, the first function providing section 901 retains data associating the URL of the primary client with the primary client ID.

The first transmitting section 903 of the first function providing section 901 corresponding to the Web API_X 109 transmits a primary authorization response to the browser 103 as a transmission source of a primary authorization notification (S2305). In the second embodiment, the primary access token (TX_A in the present example) is added as a parameter of the redirection destination URL in place of the primary authorization code.

When the browser 103 receives the primary authorization response (S2307), the browser 103 accesses the URL of the Web application_A 107 according to an HTTP redirection (S2309). At this time, the above-described parameters added to the URL of the Web application_A 107 are also handed over.

Processing illustrated in S1317 to S1323 is similar to that of FIG. 13.

Figure 24B:
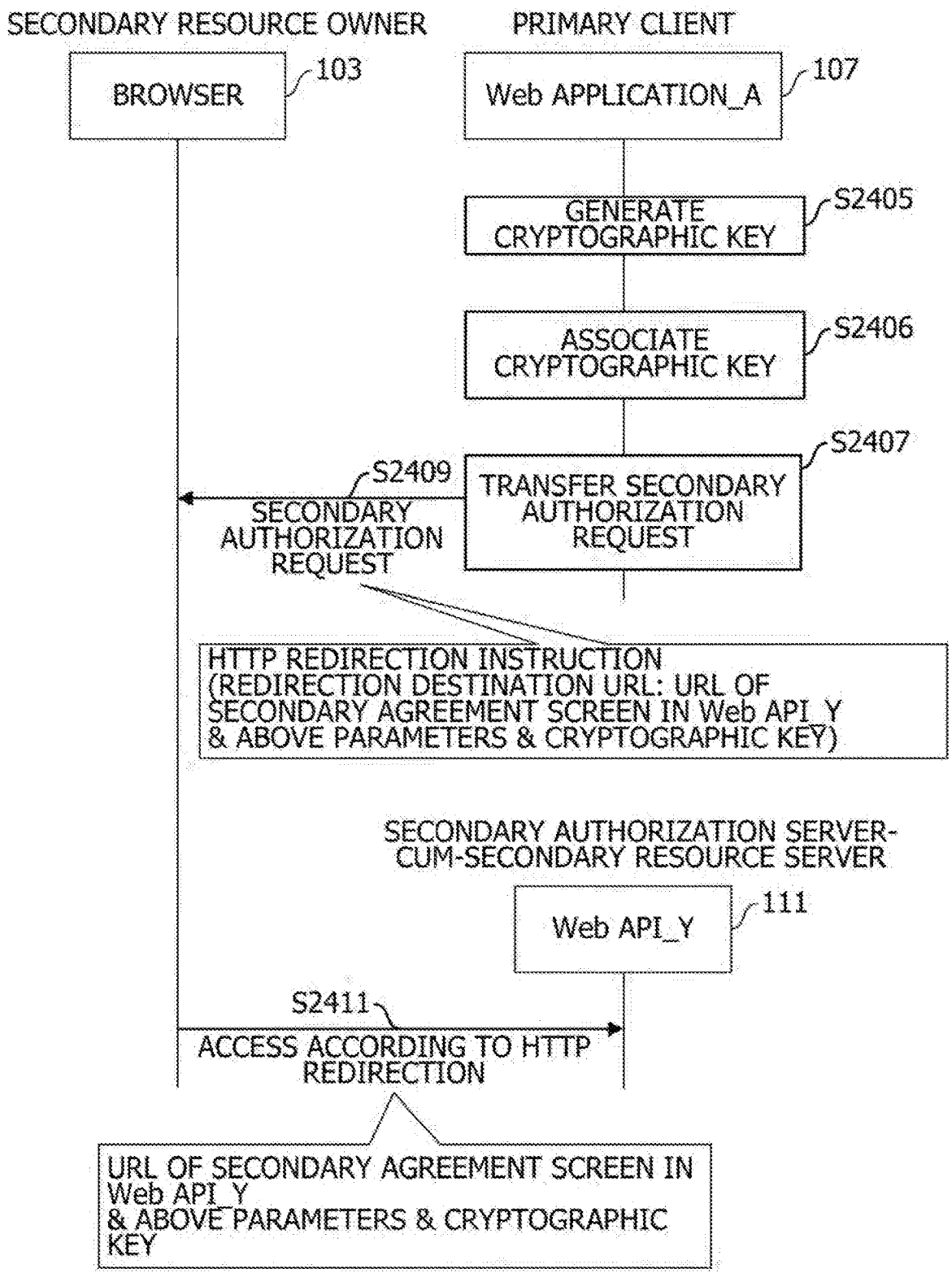
FIG. 24B is a diagram illustrating a sequence example of a secondary authorization in the second embodiment.

In the second embodiment, processing in secondary authorization sequences illustrated in FIG. 24A and FIG. 24B is performed in place of the processing in the secondary authorization sequences illustrated in FIG. 14A and FIG. 14B.

Processing illustrated in S1401 to S1405 is similar to that of FIG. 14A.

A secondary authorization request as a target of a transfer instruction in S2401 is an HTTP redirection instruction as in the first embodiment. However, in the case of the implicit grant method, an access token type is set as the secondary response type. In addition, the callback URL of the secondary authorization response is omitted.

The associating section 925 of the first function providing section 901 corresponding to the Web API_X 109 associates a local state (S2403). For example, the associating section 925 creates a new record in the second association table, and sets the primary access token, the URL of the secondary resource server, and the secondary local state (combination of the secondary random number and the primary client name) in the record. Set in the present example are TX_A as the primary access token, the URL of the Web API_Y 111 as the URL of the secondary resource server, and RX_A as the secondary random number and AAA as the primary client name.

After the receiving section 807 of the application section 801 corresponding to the Web application_A 107 receives the instruction to transfer the secondary authorization request (S2404), the processing proceeds to a sequence illustrated in FIG. 24B.

The second generating section 821 of the application section 801 corresponding to the Web application_A 107 generates a cryptographic key KA_Y (S2405). The second generating section 821 generates the cryptographic key KA_Y randomly by using a random number, for example.

The associating section 823 of the application section 801 corresponding to the Web application_A 107 associates the cryptographic key generated in S2405 with the primary access token TX_A transferred to the Web API_X 109 in the calling of the Web API_X 109 as illustrated in S1321 in FIG. 13 (S2406). For example, the associating section 823 creates a new record in the first association table, and stores the primary access token TX_A and the cryptographic key KA_Y in the record.

The transfer section 817 of the application section 801 corresponding to the Web application_A 107 transfers the received secondary authorization request to the browser 103 as a transmission source of the HTML file request in S1001 in FIG. 22 (S2407). At this time, the transfer section 817 of the application section 801 corresponding to the Web application_A 107 also adds the cryptographic key as a parameter to the secondary authorization request in addition to the above-described parameters (the secondary response type, the secondary client ID, the callback URL of the secondary authorization response, and the secondary local state).

When the browser 103 receives the secondary authorization request (S2409), the browser 103 accesses the URL of the secondary agreement screen in the Web API_Y 111 according to an HTTP redirection (S2411). At this time, the above-described parameters (the secondary response type, the secondary client ID, the callback URL of the secondary authorization response, and the secondary local state) added to the URL of the secondary agreement screen in the Web API_Y 111 and the cryptographic key are also handed over.

In the second embodiment, processing similar to that of the secondary authorization sequence illustrated in FIG. 17 is performed.

Figure 25:
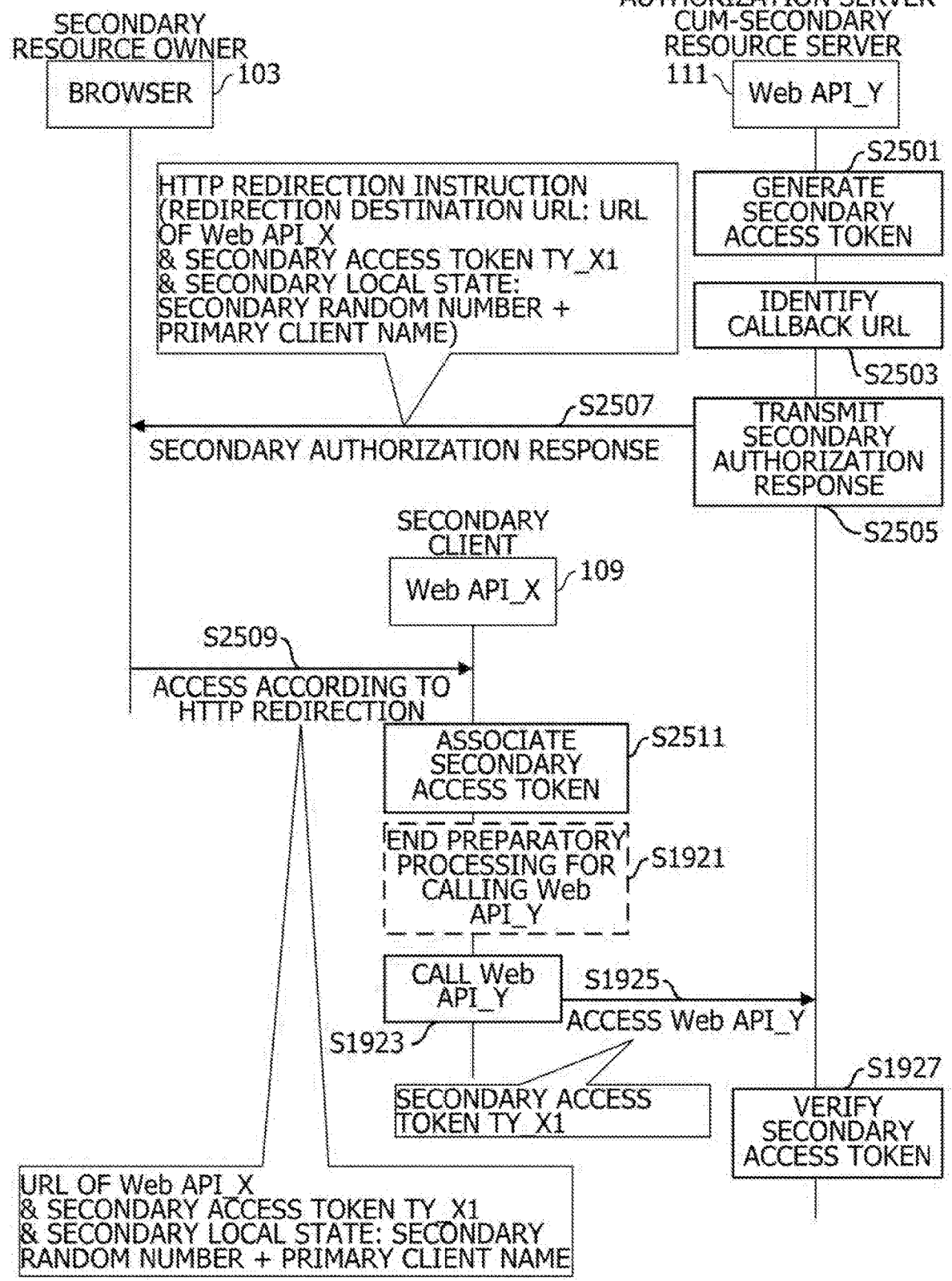
FIG. 25 is a diagram illustrating a sequence example of a secondary authorization and a secondary API call in the second embodiment.

In the second embodiment, processing in a sequence of a secondary authorization and a secondary API call illustrated in FIG. 25 is performed in place of the processing in the sequences of the secondary authorization and the secondary API call as illustrated in FIG. 18, FIG. 19A, and FIG. 19B.

The third generating section 1617 of the second function providing section 1601 corresponding to the Web API_Y 111 generates a secondary access token (S2501). A method of generating the secondary access token is based on an existing technology.

The first identifying section 1619 of the second function providing section 1601 corresponding to the Web API_Y 111 identifies a callback URL based on the secondary client ID (S2503). The callback URL is the URL of the secondary client. Incidentally, suppose that, as in the existing technology, the second function providing section 1601 retains data associating the URL of the secondary client with the secondary client ID.

The first transmitting section 1603 of the second function providing section 1601 corresponding to the Web API_Y 111 transmits a secondary authorization response to the browser 103 as a transmission source of a secondary authorization notification (S2505). In the second embodiment, the secondary access token (TY_X1 in the present example) is added as a parameter of the redirection destination URL in place of the secondary authorization code.

When the browser 103 receives the secondary authorization response (S2507), the browser 103 accesses the URL of the Web application_A 107 according to an HTTP redirection (S2509). At this time, the above-described parameters added to the URL of the Web API_X 109 are also handed over.

The associating section 925 of the first function providing section 901 corresponding to the Web API_X 109 associates the secondary access token (S2511). For example, the associating section 925 of the first function providing section 901 corresponding to the Web API_X 109 sets the secondary access token in the record created in S2403 in FIG. 24A. At this time, the associating section 925 of the first function providing section 901 corresponding to the Web API_X 109 may identify the record based on the secondary local state. Thus, the secondary access token is consequently associated with the primary access token.

Processing illustrated in S1921 to S1927 is similar to that of FIG. 19B.

In addition, in the second embodiment, processing similar to that of the sequences illustrated in FIG. 20A, FIG. 20B, and FIG. 21 is performed.

According to the present embodiment, effects similar to those of the first embodiment may be produced also in the case where the access tokens are issued by the implicit grant method.

Figure 26:
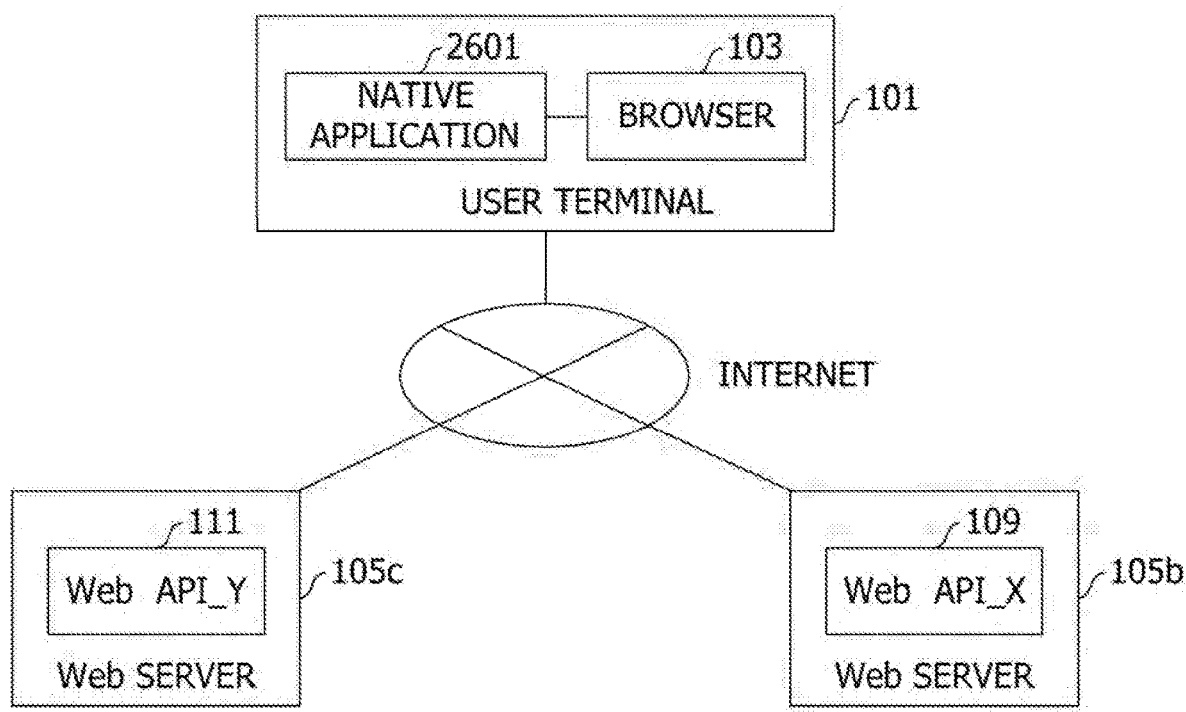
FIG. 26 is a diagram illustrating an example of a configuration of a network.

Incidentally, the foregoing embodiments assume the use of Web APIs by a Web application as an example of an application program cooperating with the browser 103. However, it may be assumed that, as an example of a program cooperating with the browser 103, a native application 2601 uses Web APIs as illustrated in FIG. 26, and the foregoing embodiments may be applied. FIG. 26 is a diagram illustrating an example of a configuration of a network.

Embodiments of the present technology have been described above. However, the present technology is not limited thereto. For example, the above-described functional block configurations may not coincide with program module configurations.

In addition, the configuration of each storage area described above is an example, and does not necessarily need to be the configuration as described above. Further, also in the processing flows, the order of processing may be interchanged or a plurality of pieces of processing may be performed in parallel with each other as long as a processing result is not changed.

FIG. 27 is a functional block diagram of a computer. Incidentally, the user terminal 101 and the Web servers 105 described above are a computer device, and are formed, as illustrated in FIG. 27, by coupling a memory 2501, a CPU 2503, a hard disk drive (HDD) 2505, a display control section 2507 coupled to a display device 2509, a drive device 2513 for a removable disk 2511, an input device 2515, and a communication control section 2517 for connecting to a network to each other by a bus 2519. The CPU may be referred to as a processor. An operating system (OS) and an application program for performing processing in the present embodiments are stored on the HDD 2505, and read from the HDD 2505 into the memory 2501 when executed by the CPU 2503. The CPU 2503 controls the display control section 2507, the communication control section 2517, and the drive device 2513 according to processing contents of the application program to make the display control section 2507, the communication control section 2517, and the drive device 2513 perform given operations. In addition, data in a process of being processed is stored mainly in the memory 2501, but may be stored on the HDD 2505. In the embodiments of the present technology, the application program for performing the processing described above is distributed in a state of being stored on a computer readable removable disk 2511, and installed from the drive device 2513 onto the HDD 2505. The application program may be installed onto the HDD 2505 via the network such as the Internet and the communication control section 2517. Such a computer device implements various kinds of functions as described above when hardware such as the CPU 2503 and the memory 2501 described above and programs such as the OS and the application program cooperate with each other organically.

Embodiments of the present technology described above are summarized as follows.

An information processing device according to a present embodiment is an information processing device using a primary function provided by a first server, the information processing device including: (A) a receiving section configured to receive, from the first server, access destination data effecting redirection to a second server providing a secondary function to be used by the primary function; (B) a transfer section configured to send key data for encryption to the second server by adding the key data for encryption to the access destination data, transferring the access destination data to a browser, and redirecting the browser; and (C) a decrypting section configured to decrypt encrypted data based on at least a part of a response by the secondary function, the encrypted data being included in a response by the primary function, by using key data for decryption, the key data for decryption being adapted to the key data for encryption.

Thus, the response of the secondary function which response is included in the response of the primary function may be concealed.

Further, the access destination data may be a URL of an agreement screen related to usage of the secondary function.

Thus, processing becomes relatively easy.

Further, the key data for encryption and the key data for decryption may be a common key in a symmetric encryption system.

Thus, the symmetric encryption system may be adopted.

Further, the key data for encryption may be an encryption key in an asymmetric encryption system, and the key data for decryption may be a decryption key in the asymmetric encryption system.

Thus, the asymmetric encryption system may be adopted.

An access control system according to a present embodiment is an access control system including: a first server configured to provide a primary function via a network; a second server configured to provide a secondary function via the network; and an application device configured to use the primary function. The application device includes (D) a first storage section configured to store primary authentication data and first key data in association with each other and (E) a first calling section configured to call the primary function with the primary authentication data. The first server includes (F) a second storage section configured to store the primary authentication data and secondary authentication data in association with each other, (G) a first verifying section configured to verify the primary authentication data when the primary function is called, (H) a searching section configured to search for the secondary authentication data corresponding to the primary authentication data, and (I) a second calling section configured to call the secondary function with the secondary authentication data. The second server includes (3) a third storage section configured to store the secondary authentication data and second key data in association with each other, (K) a second verifying section configured to verify the secondary authentication data when the secondary function is called, (L) a first identifying section configured to identify the second key data corresponding to the secondary authentication data, (M) an encrypting section configured to encrypt, by the second key data, at least partial data of a secondary response generated by the secondary function, and (N) a first transmitting section configured to transmit the secondary response including the encrypted data to the first server as a secondary caller. The first server further includes (O) a first receiving section configured to receive the secondary response including the encrypted data and (P) a second transmitting section configured to transmit a primary response generated by the primary function, the primary response including the encrypted data, to the application device as a primary caller. The application device further includes (Q) a second receiving section configured to receive the primary response including the encrypted data, (R) a second identifying section configured to identify the first key data corresponding to the primary authentication data added to a primary call as a trigger for the primary response, and (E) a decrypting section configured to decrypt the encrypted data using the first key data.

Thus, the concealed secondary response may be restored based on a proper access right.

The application device may further include (T) a transfer section configured to add the second key data to an authorization request related to the secondary function, the authorization request being received from the first server and being to be transferred to a user terminal, and transfer the authorization request. The second server may further include (U) a third receiving section configured to receive the second key data from the user terminal by a redirection according to the authorization request and (V) an associating section configured to associate the second key data with the secondary authentication data when the secondary authentication data related to calling of the secondary function is generated.

Thus, key data received from the application device may be associated with a proper access right.

Further, the first key data and the second key data may be a common key in a symmetric encryption system.

Thus, the symmetric encryption system may be adopted.

Further, the first key data may be a decryption key in an asymmetric encryption system, and the second key data may be an encryption key in the asymmetric encryption system.

Thus, the asymmetric encryption system may be adopted.

An information processing device according to a present embodiment includes: (W) a receiving section configured to receive key data in access to an agreement screen related to usage of a function provided by the information processing device; (X) an associating section configured to associate the key data with authentication data issued on a basis of an authorization notification received from a transmission destination of the agreement screen; and (Y) an encrypting section configured to, when a call of the function is performed, encrypt at least a part of a response by the function by using the key data corresponding to the authentication data added to the call.

Thus, encryption may be performed by using key data based on a proper access right.

Incidentally, a program for making a computer perform processing in the information processing device, the first server, the second server, and the application device described above may be created, and the program may be stored in a computer readable storage medium or a storage device such as a flexible disk, a compact disc read only memory (CD-ROM), a magneto-optical disk, a semiconductor memory, or a hard disk. Incidentally, intermediate processing results are temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a memory storing instructions; and
   a processor, coupled to the memory, that executes the instructions to perform a process comprising:
      performing primary authorization between the browser of the terminal that is requesting a primary function from a first web application on a first server;
      sending notification to the browser that the primary function uses a secondary function provided on a second server, the notification redirecting the browser to the second server;
      performing secondary authorization between the browser and the second server, the secondary authorization includes receiving an encryption key from the first server along with identification information of the second server redirecting the browser to the second server and transmitting the encryption key from the browser to the second server;
      receiving a primary function response from the first server, the primary function response including a secondary function response that is encrypted by the second server using the encryption key;
      receiving, by a secondary client, an access token from the browser when the secondary authorization is completed, requests the secondary function response from the second server, and provides the secondary function response from the second server to the first server;
      receiving, from the first server, access destination data effecting redirection to the second server providing the secondary function to be used by the primary function,
      sending key data for encryption to the second server by adding the key data for encryption to the access destination data, transferring the access destination data to a browser, and redirecting the browser; and
      decrypting encrypted data based on at least a part of a response by the secondary function, the encrypted data being included in a response by the primary function, by using key data for decryption, the key data for decryption being adapted to the key data for encryption.

2. The information processing device according to claim 1, wherein the access destination data is a uniform resource locator of an agreement screen related to usage of the secondary function.

3. The information processing device according to claim 1, wherein the key data for encryption and the key data for decryption are a common key in a symmetric encryption system.

4. The information processing device according to claim 1, wherein the key data for encryption is an encryption key in an asymmetric encryption system, and the key data for decryption is a decryption key in the asymmetric encryption system.

5. The information processing device according to claim 1 further comprising concealing the encrypted data from a client that requests the secondary function from the second server.

6. An access control system comprising:
   a first server configured to provide a primary function via a network;
   a second server configured to provide a secondary function via the network; and
   an application device configured to use the primary function;
   the application device including
      a first storage section configured to store primary authentication data and first key data in association with each other, and
      a first processor configured to call the primary function with the primary authentication data;
   the first server including
      a second storage section configured to store the primary authentication data and secondary authentication data in association with each other, and
      a second processor, the second processor being configured to
         verify the primary authentication data when the primary function is called,
         search for the secondary authentication data corresponding to the primary authentication data, and
         call the secondary function with the secondary authentication data;
   the second server including
      a third storage section configured to store the secondary authentication data and second key data in association with each other, and
      a third processor, the third processor being configured to
         verify the secondary authentication data when the secondary function is called,
         identify the second key data corresponding to the secondary authentication data,
         encrypt, by the second key data, at least partial data of a secondary response generated by the secondary function, and
         transmit the secondary response including the encrypted data to the first server as a secondary caller;
   the second processor of the first server being configured to
      receive the secondary response including the encrypted data, and transmit a primary response generated by the primary function, the primary response including the encrypted data, to the application device as a primary caller;

the first processor of the application device being configured to receive the primary response including the encrypted data, identify the first key data corresponding to the primary authentication data added to a primary call as a trigger for the primary response, and decrypt the encrypted data using the first key data.

7. The access control system according to claim 6, wherein the first processor of the application device adds the second key data to an authorization request related to the secondary function, the authorization request being received from the first server and being to be transferred to a user terminal, and transfers the authorization request, and the third processor of the second server receives the second key data from the user terminal by a redirection according to the authorization request, and associates the second key data with the secondary authentication data when the secondary authentication data related to calling of the secondary function is generated.

8. The access control system according to claim 6, wherein the first key data and the second key data are a common key in a symmetric encryption system.

9. The access control system according to claim 6, wherein the first key data is a decryption key in an asymmetric encryption system, and the second key data is an encryption key in the asymmetric encryption system.

10. A computer-implemented method for secure communications between a browser of a terminal device and a plurality of web applications providing resources to the terminal, the method comprising:

performing primary authorization between the browser of the terminal that is requesting a primary function from a first web application on a first server;

sending notification to the browser that the primary function uses a secondary function provided on a second server, the notification redirecting the browser to the second server;

performing secondary authorization between the browser and the second server, the secondary authorization includes receiving an encryption key from the first server along with identification information of the second server redirecting the browser to the second server and transmitting the encryption key from the browser to the second server; and receiving a primary function response from the first server, the primary function response including a secondary function response that is encrypted by the second server using the encryption key, a secondary client receives an access token from the browser when the secondary authorization is completed, requests the secondary function response from the second server, and provides the secondary function response from the second server to the first server.

11. The computer-implemented method according to claim 10, wherein the secondary function response that is encrypted is concealed from the secondary client.

* * * * *